US006682586B2

(12) United States Patent
Frame et al.

(10) Patent No.: US 6,682,586 B2
(45) Date of Patent: Jan. 27, 2004

(54) ASSEMBLIES AND METHODS FOR PROCESSING ZINC-BEARING MATERIALS

(75) Inventors: Scott W. Frame, Anniston, AL (US); Shannon R. Wilson, Indianapolis, IN (US); James E. Bratina, Greenwood, IN (US)

(73) Assignee: Heritage Environmental Services, LLC., Indianapolis, IN (US)

(*) Notice: Subject to any disclaimer, the term of this patent is extended or adjusted under 35 U.S.C. 154(b) by 146 days.

(21) Appl. No.: 09/973,503

(22) Filed: Oct. 9, 2001

(65) Prior Publication Data

US 2003/0159540 A1 Aug. 28, 2003

(51) Int. Cl.⁷ .............................................. C22B 19/04
(52) U.S. Cl. .................. 75/658; 266/144; 266/148; 266/177; 423/107
(58) Field of Search .................. 75/658; 423/107; 266/144, 177, 148

(56) References Cited

U.S. PATENT DOCUMENTS

| | | | |
|---|---|---|---|
| 1,549,880 A | * | 8/1925 | Johnson ..................... 75/658 |
| 4,005,981 A | | 2/1977 | Turnbull |
| 4,407,488 A | * | 10/1983 | Wanetzky et al. .......... 266/148 |
| 4,595,574 A | * | 6/1986 | Matsuoka et al. .......... 423/107 |
| 4,764,216 A | | 8/1988 | Hooykaas |
| 4,840,671 A | | 6/1989 | Lynn et al. |
| 4,911,757 A | | 3/1990 | Lynn et al. |
| 5,013,532 A | | 5/1991 | Sresty |
| 5,278,111 A | | 1/1994 | Frame |
| 5,538,532 A | | 7/1996 | Keegel, Jr. |
| 5,613,847 A | | 3/1997 | Lingl |
| 5,667,378 A | | 9/1997 | Bushman |
| 5,667,553 A | | 9/1997 | Keegel, Jr. |
| 5,672,146 A | | 9/1997 | Aota |
| 5,788,740 A | | 8/1998 | Chase |
| 5,853,474 A | | 12/1998 | Hilton |
| 6,085,911 A | | 7/2000 | Greenleigh et al. |
| RE36,921 E | | 10/2000 | Bushman et al. |
| 6,221,124 B1 | | 4/2001 | Blom |

OTHER PUBLICATIONS

V.R. Daiga and D.A. Horne, "Production of Crude Zinc Oxide From Steel Mill Waste Oxides Using a Rotary Hearth Furnace", Recycling of Metals and Engineered Materials, TMS, 2000 (pp. 361–368). No Month.

(List continued on next page.)

Primary Examiner—Melvyn Andrews
(74) Attorney, Agent, or Firm—Baker & Daniels

(57) ABSTRACT

A process for separating and recovering a desired metal as metal oxide from raw material is provided. The process includes placing the raw material and a reductant in a container to form a reducing microclimate within the container. A housing having an oxidizing atmosphere is heated to maintain a temperature zone within the housing at a heating temperature sufficient to expose the raw material in the container to a reaction temperature. The container containing the raw material is conveyed through the temperature zone in the housing to expose the raw material and the reductant to the reaction temperature wherein the metal oxide is reduced to a gaseous metal that exits the container. Once outside the container, the gaseous metal is exposed to the oxidizing atmosphere of the temperature zone wherein the desired metal is oxidized to metal oxide and the metal oxide is collected. In preferred embodiments, the raw material is EAF dust and the desired metal is zinc. In one specific embodiment, the process also includes maintaining a second temperature zone in the housing at a metal halide vaporization temperature, which is lower than the heating temperature. A flow of air is applied through the housing in a direction that is opposite to a direction of travel of the container during the conveying step, whereby a metal halide in the raw material is volatilized to a volatilized metal halide when the container is conveyed through the second heating zone. The volatilized metal halide is then collected.

45 Claims, 18 Drawing Sheets

OTHER PUBLICATIONS

S.E. James, "Recycling of Zinc", Jun., 2000 (pp. 1–30).

M. Liebman, "The Current Status of Electric Arc Furnace Dust Recycling in North America", Recycling of Metals and Engineered Materials, TMS, 2000 (pp. 237–250). No Month.

F. Sauert, U. Kerney and J. Pesl, "Recycling EAF Dust With Contop Technology", Recycling of Metals and Engineered Materials, TMS, 2000 (pp. 427–441). No Month.

L.M. Southwick, "EAF Dust Management Overview of Regulations and Processing Technologies", Jan. 15, 1999 (58 pages).

L.M. Southwick, "Recycling Zinc Recovered From Electric Arc Furnace Dust: Is There a Better Way?", EPD '98 (pp. 1–20). No Month.

D.Y. Wang, X.L. Shen, D.R. Gu and G.Y. Sha, "Volatilization Kinetics of Zinc and Lead in ZN–PB–Bearing Dust Pellets Containing Carbon", Recycling of Metals and Engineered Materials, TMS, 2000 (pp. 297–311). No Month.

G. Ye, "Characterisation and Removal of Halogens in the EAF Dust and Zinc Oxide Fume Obtained From Thermal Treatment of EAF Dust", Recycling of Metals and Engineered Materials, TMS, 2000 (pp. 271–280).

A.D. Zunkel, "Recovering Zinc and Lead From Electric Arc Furnace Dust: A Technology Status Report", Recycling of Metals and Engineered Materials, TMS, 2000 (pp. 227–236). No Month.

Internet pages from www.ceramics.com by Consolidated Materials Brokers, "The Process" and "Recycling Steel Mill Waste: EAF Dust Processing for Low Cost Steel, Zinc and Brick Production" (6 pages total), printed Jun. 18, 2001.

Product literature entitled "Here's How HRD's Waste Recycling Works". No date.

* cited by examiner

ASSEMBLIES AND METHODS FOR PROCESSING ZINC-BEARING MATERIALS

FIELD OF THE INVENTION

The present invention relates generally to separating, collecting and processing materials, and more specifically to treatment of electric arc furnace dust.

BACKGROUND OF THE INVENTION

One way to produce steel is to refine iron in an electric arc furnace (EAF), in which heat is supplied by arcs struck through the molten metal between carbon electrodes. Melting and refining proceed simultaneously after the solid charge is submerged below a layer of molten metal. This procedure is used primarily for refining steel scrap and direct reduced iron. Very high temperatures are generated in the arc plasma and volatile species are effectively removed from the metal. Dust, called EAF dust, is generated during the process, and collected by a baghouse.

In a recent market research survey of 76 EAF shops in the U.S., a total of 1,069,457 tons of EAF dust were generated by the plants surveyed in 1999. For all EAF shops in the US and Canada, it was estimated 1.2 million tons of EAF dust were generated in 1999. Overall, 82% of the EAF shops responded that between 25 to 44 pounds of EAF dust per ton of steel is produced. The amount of EAF dust generated is expected to increase each year as increasing amounts of steel is produced from galvanized steel scrap in EAF shops. The increasing use of galvanized steel scrap has resulted in higher levels of zinc in the EAF dust.

EAF dust has a complex mineralogy. Prior research has identified, by X-ray diffraction (XRD) and scanning electron microscopy (SEM) analyses, the major components of EAF dust are predominately iron oxide, zinc oxide and zinc ferrite with well defined peaks of sodium chloride and potassium chloride present. Because calcium oxide is added to desulfurize and remove silica from the steel in the EAF, calcium compounds are predominant in various amounts in the EAF dust. Chloride can exist in a calcium chloride phase with magnesium, iron, zinc, lead and cadmium.

Since EAF dust contains hazardous materials, such as lead and cadmium, it is a costly and time consuming problem for steel manufacturers. Although many processes have been reported, the most common ways to deal with EAF dust is shipping it to an offsite processor for landfill or recycling. In addition to the environmental reasons, it would be economically and environmentally desirable to find an alternative to disposal because the components of EAF dust are valuable when separated and recovered. One of the constituents of EAF dust that is particularly of interest is zinc.

The most common zinc recycling process employs a rotary kiln. EAF dust is mixed with coal and charged to the kiln. Zinc oxide in the EAF dust is reduced to zinc metal, which boils or vaporizes off and then is oxidized to zinc oxide. The zinc oxide formed at this stage is of a low quality, but it can be upgraded by passing it through a second kiln and using other subsequent processing techniques. While the concept of recycling the constituents of EAF dust and other zinc bearing materials is encouraging in theory, it has proven too difficult and expensive.

Therefore, a need remains for economical processes for recovering, separating and recycling the constituents of EAF dust and other materials containing metal.

SUMMARY OF THE INVENTION

Briefly describing one aspect of the invention, a process for separating and recovering a desired metal as metal oxide from raw material containing metal oxides is provided. The process includes placing the raw material and a reductant in a container to form a reducing microclimate within the container. A housing is heated to maintain a temperature zone within the housing at a heating temperature sufficient to expose the raw material in the container to a reaction temperature. The reaction temperature is higher than the boiling point of the desired metal. The temperature zone within the housing has an oxidizing atmosphere. The process further includes conveying the container containing the raw material through the temperature zone in the housing to expose the raw material and the reductant to the reaction temperature wherein the metal oxide is reduced to a gaseous metal that exits the container. Once outside the container, the gaseous metal is exposed to the oxidizing atmosphere of the temperature zone wherein the desired metal is oxidized to metal oxide. The process also includes collecting the metal oxide.

In one specific embodiment, the housing is a tunnel kiln. In preferred embodiments, the raw material is EAF dust and the desired metal is zinc. Using the methods of this invention, zinc oxide collected from the housing has less than about 0.06% impurities and the iron-rich product has between less than about 1.0 % zinc and less than detectable levels of lead and cadmium. In some embodiments, the invention includes collecting volatilized halogens of lead and cadmium in a baghouse.

In some cases, the reaction temperature is at least about 900° C. (1652° F.), with one preferred temperature range for the reaction temperature being between about 1218° C. (2225° F.) and about 1649° C. (3000° F.). In one specific embodiment, the reductant contains carbon, such as coke or coal. In other embodiments, the reductant contains a metal, such as aluminum. In another aspect of this invention, the heating step includes maintaining the temperature zone at an oxygen level of at least about 2.0%. In other preferred embodiments, the heating step includes maintaining the partial pressure of carbon monoxide to carbon dioxide within the container at a ratio that is sufficient to achieve a reducing microclimate within the container.

In one specific embodiment, the process also includes maintaining a second temperature zone in the housing at a metal halide vaporization temperature, the metal halide temperature being lower than the heating temperature. A flow of air is applied through the housing in a direction that is opposite to a direction of travel of the container during the conveying step, whereby a metal halide in the raw material is volatilized to a volatilized metal halide when the container is conveyed through the second heating zone. The volatilized metal halide is then collected and separated from the metal oxide. The metal halide vaporization temperature is preferably between about 1600° F. and about 2000° F., with a most preferred temperature of about 1800° F.

In embodiments in which the raw material does not contain halides, the methods can include mixing a halide with the raw material and the reductant, whereby the halide reacts with metal coumpounds in the raw material to form metal halides. In preferred embodiments, the halide is a chloride.

In certain preferred embodiments, the processes include mixing the raw material with the reductant before the placing step. The raw material and the reductant can be blended with a binding agent to form a blend and the blend formed into formed units, such as pellets or briquettes. In some embodiments the binding agent includes water. In some embodiments, the binding agent includes water present in the amount of about 3.0 wt % to about 20.0 wt %. In one particular embodiment, the raw material is present in the blend in an amount between about 65 wt % and about 80 wt %, the reductant is present in an amount between about 10 wt % and about 20 wt % and the binding agent is present in an amount between about 10 wt % and about 20 wt %. In preferred embodiments, the reductant is present in an amount sufficient to completely reduce the zinc oxide present in the electric arc furnace dust. In one specific embodiment, the raw material is present in the blend in an amount of about 84.5 wt %, the reductant is present in an amount of about 12.0 wt % and the binding agent is present in an amount of about 3.0 wt %.

In another specific embodiment, the placing step includes loading the formed units in the bed to a depth of between about 1.0 inches (2.5 cm) to about 14.0 inches (35.5 cm). In preferred embodiments, the placing step includes loading the formed units in the bed to a depth of between about 5.0 inches (12.7 cm) to about 9.0 inches (22.9 cm), with a most preferred depth being about 6.0 inches (15.2 cm). In some embodiments, the placing step includes loading the container with blend so that the container has a vent area/ material volume ratio of at about 0.25 feet² of vent area per cubic foot of blend within the bed.

In one aspect, the conveying step includes conveying the container on a kiln car and the collecting step includes collecting the metal oxide from the kiln car as the kiln car exits the housing. The conveying step, in one embodiment, includes conveying the container through the temperature zone in about one to about twenty hours. In one specific embodiment, the container is conveyed through the temperature zone in about ten to about fourteen hours.

Accordingly, it is one object of the invention to provide economical processes for recovering, separating and processing desired metals from metal bearing raw materials. Another object is to recover high quality zinc from EAF dust and other zinc bearing materials. These and other objects, advantages and features are accomplished according to the devices, assemblies and methods of the present invention. Other objects and further benefits of the present invention will become apparent to persons of ordinary skill in the art from the following written description and accompanying Figures.

DESCRIPTION OF THE PREFERRED EMBODIMENTS

Figure 1:
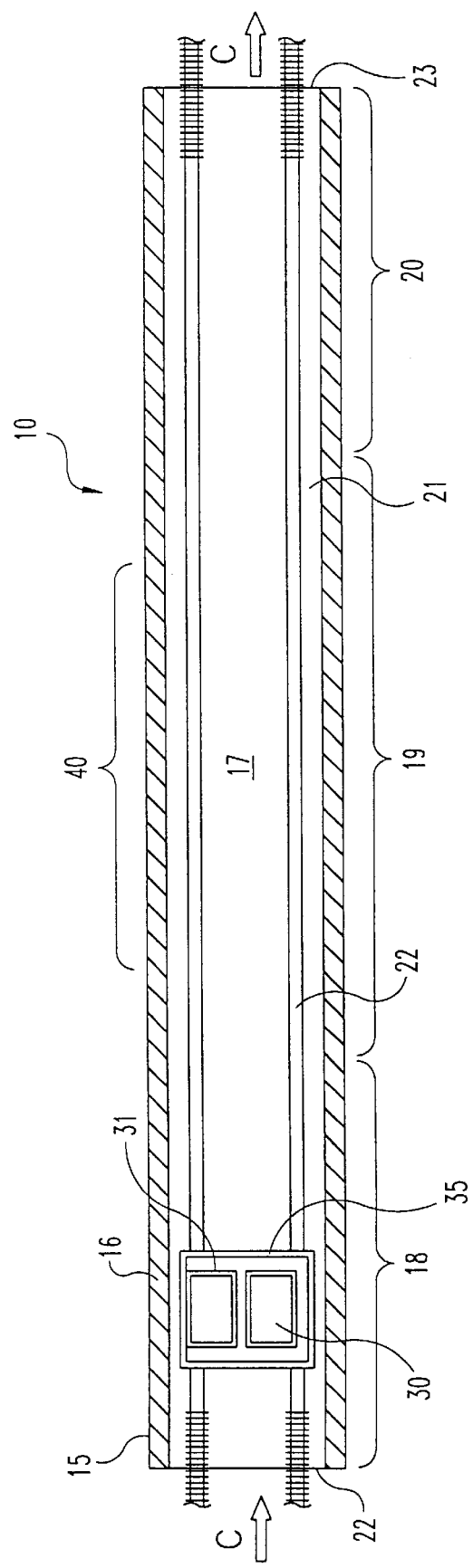
FIG. 1 is a top cross sectional view of a tunnel kiln assembly of this invention.

For the purposes of promoting an understanding of the principles of the invention, reference will now be made to the embodiments illustrated in the drawings and examples, and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

The present invention provides an economically feasible and environmentally friendly solution to the problem of electric arc furnace ("EAF") dust and other zinc bearing materials. The invention accomplishes reduction, oxidation, and separation of zinc oxide from lead and other toxic or otherwise undesirable constituents and collection of metal halides in a single step, while prior art methods require multiple steps. The processes yield a very high quality zinc oxide that has about 99.8% purity and a second, medium grade zinc product (which is a marketable product) that has small quantities of lead, cadmium and chloride. In addition, use of this invention allows iron-rich product to be efficiently and economically separated from EAF dust and other waste materials so that the iron-rich product can be recovered for processing. For example, the iron-rich product can be returned to the furnace to produce steel. While, the iron-rich product may contain trace metals, it contains less than one percent (1%) zinc and less than 10 ppm of lead.

One of the reasons that the present invention achieves such clean and nearly complete separation of the major constituents of the feed stock or waste is that the invention provides long, slow heating and cooling cycles with a complete absence of physical abrasion and turbulence within the kiln. Therefore, one advantage of this invention is that valuable metals, such as zinc, can also be recovered from the waste while the amount of toxic metals is reduced in the products. One particularly environmentally advantageous aspect is that the methods of this invention are energy efficient. Moreover, this invention provides an economically viable alternative to landfilling waste.

In addition to the environmentally friendly aspects of this invention, the present invention can be easily and economically used with conventional technology that has been used reliably for decades. The process described in U.S. Pat. No.

5,278,111 to Scott Frame for manufacturing bricks from EAF dust using a tunnel kiln was a precursor to the present invention. Tunnel kilns have been used for many years to manufacture brick and require a relatively low capital investment because of their simple design. Moreover, tunnel kilns are less expensive to operate than the leading prior art methods for processing EAF dust. The present invention also exploits high temperature separation techniques for which the chemistry is well understood. In addition, use of this invention results in useable products that have positive market value. There are no wastes generated. In fact, the processes of this invention consistently and efficiently yield high-grade zinc oxide when the invention is used to process EAF dust, for example.

In one particular embodiment, an assembly of this invention is built on site of the source location of a waste material producing manufacturing unit. Building the assembly on site is possible using this invention because of its simplicity and lower capital and operating costs advantages. Having an assembly of this invention at such sites saves freight costs. In addition, for an EAF operation, the zinc and iron-rich product in the EAF dust never become waste materials because they are integrated into the process to be upgraded as products. The iron-rich material can be immediately moved back to the furnace, cement kiln or other process requiring iron-rich feed stock, and the zinc is collected as zinc oxide and transported to a customer. One of the most important advantages of this embodiment is that regulated materials, such as EAF dust, are now feedstock, not waste. Since the materials never become waste, as defined by the EPA, the RCRA regulatory burden is lifted from the host facility.

In preferred embodiments, a reducing micro-atmosphere is created within an oxidizing atmosphere within a tunnel kiln. According to this invention, a waste material, such as EAF dust, which contains an oxide of a desired metal, such as zinc oxide, is loaded into a container along with a reducing agent. The container is configured to maintain a reducing micro-atmosphere. The loaded container is conveyed through a tunnel kiln which has a temperature zone maintained at a temperature that is higher than the boiling point of the desired metal. When the waste material is exposed to the reducing environment and the temperature zone, volatized metal fume is produced. The fume leaves the container where it encounters the oxidizing atmosphere within the kiln. The metal fume is then oxidized, precipitates, and can be collected. The metal oxides produced in this manner have been found to be of surprisingly high purity. In addition, metal halides, such as lead and zinc, in the raw materials will be volatilized when the container is exposed to the boiling point of the metal chlorides. The metal chloride is then boiled away from the container and carried to a baghouse collection system. This provides separation from the higher purity zinc oxide in a single step.

The present invention provides an elegant alternative to EAF and other waste recycling processes. While the chemistry employed by the invention is well proven and reliable, the invention includes methods and assemblies that provide results that are far superior to the prior art. While other high-temperature metal recovery processes use some of the same oxidation and reduction steps to produce zinc products, there are major differences between the present invention and other prior art processes. One difference is that other processes agitate the feed stock, which causes elutriation of impurities in the metallurgical fumes that the process is designed to separate. This results in zinc and iron products that have high levels of impurities and lower values. Another difference is that many processes require at least two separate thermal devices; while the present invention needs only a single system.

The single thermal devices of this invention are more economical than the prior art for several reasons. Due to the heat recuperative nature of the tunnel kiln, the assemblies of invention are more highly energy efficient. In addition, the processes of this invention require simple equipment with much lower capital cost than other processes. The equipment required for processes are also less expensive to maintain. For example, since the feed stock does not come in contact with the kiln lining, it is unnecessary to reline the furnace as is required in other processes. Therefore, the present invention provides several important advantages that are not found in the prior art.

Figure 2:
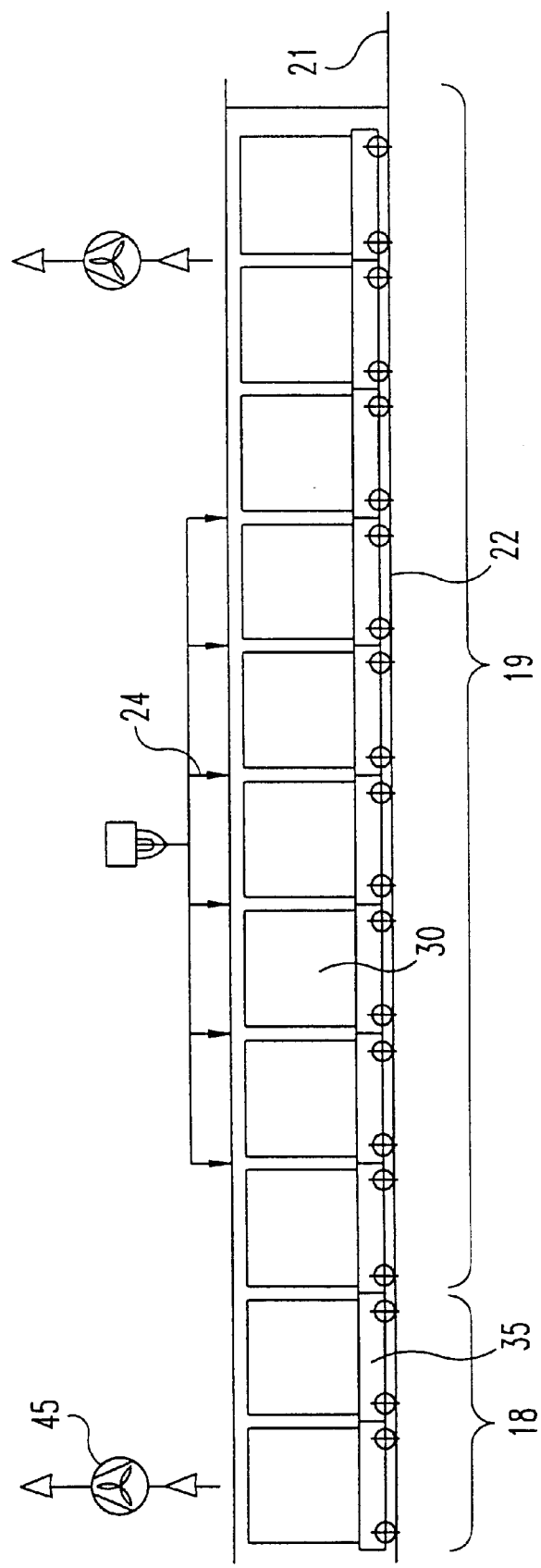
FIG. 2 is a side view of the interior of the assembly of FIG. 1 loaded with kiln cars and showing a portion of the hot zone.

In one embodiment, the present invention provides an assembly 10 for separating and recovering desired metals and iron-rich product from waste material containing metal oxides and iron-rich materials. Referring now to FIG. 1, assembly 10 includes a tunnel kiln 15 having a housing 16 defining an elongated tunnel 17. A tunnel configuration is preferred because it allows maintenance of a number of different temperature zones and slow movement of the materials through the temperature zones. Tunnel kilns are known in the art, and such known tunnel kilns can be adapted for the present invention. The tunnel kiln of this particular embodiment includes a preheating zone 18, a heating zone 19 and a cooling zone 20. In one particular embodiment, the temperature increases within the heating zone 19 in the direction of arrow C. Referring to FIG. 2, which shows one portion of the hot zone, the kiln is heated with burner elements 24. In this particular embodiment, the burner elements 24 are shown at the upper portion of the housing 16, however, any suitable configuration is contemplated. For example, the burner elements could be positioned on a lower or side surface of the tunnel 17.

For transport through the tunnel 17, the raw material is loaded into containers. In a specific embodiment, the containers are saggers 30 of the type typically used to convey small materials, such as spark plugs and catalysts, through tunnel kilns. In one embodiment, the container or sagger 30 is configured so that an atmosphere that is different from the atmosphere inside the tunnel 15 can be maintained. This allows the reduction and subsequent oxidation to occur. The saggers 30 (FIG. 3) enter the tunnel 17 at the entrance 22 and travel through the tunnel 17 in the direction of Arrow C via suitable means, such as kiln cars 35, which are engaged to rails 22 positioned on the floor 21 of the kiln 15. The saggers 30 pass through the preheat zone 18 and into the hot zone 19 and then through the cooling zone 20 and then through the exit 23 of the tunnel kiln 15.

Of course, any suitable means for transporting the container through the tunnel is contemplated. An automatic conveyance system is preferred. Referring again to FIGS. 1 and 2, in one particular embodiment, the saggers 30 are stacked, covered and placed onto specially designed kiln cars 35, which ferry the saggers through the temperature zones. The particular conveying means is not critical to the invention. One of ordinary skill in the art will be readily able to select appropriate conveying means.

Figure 3:
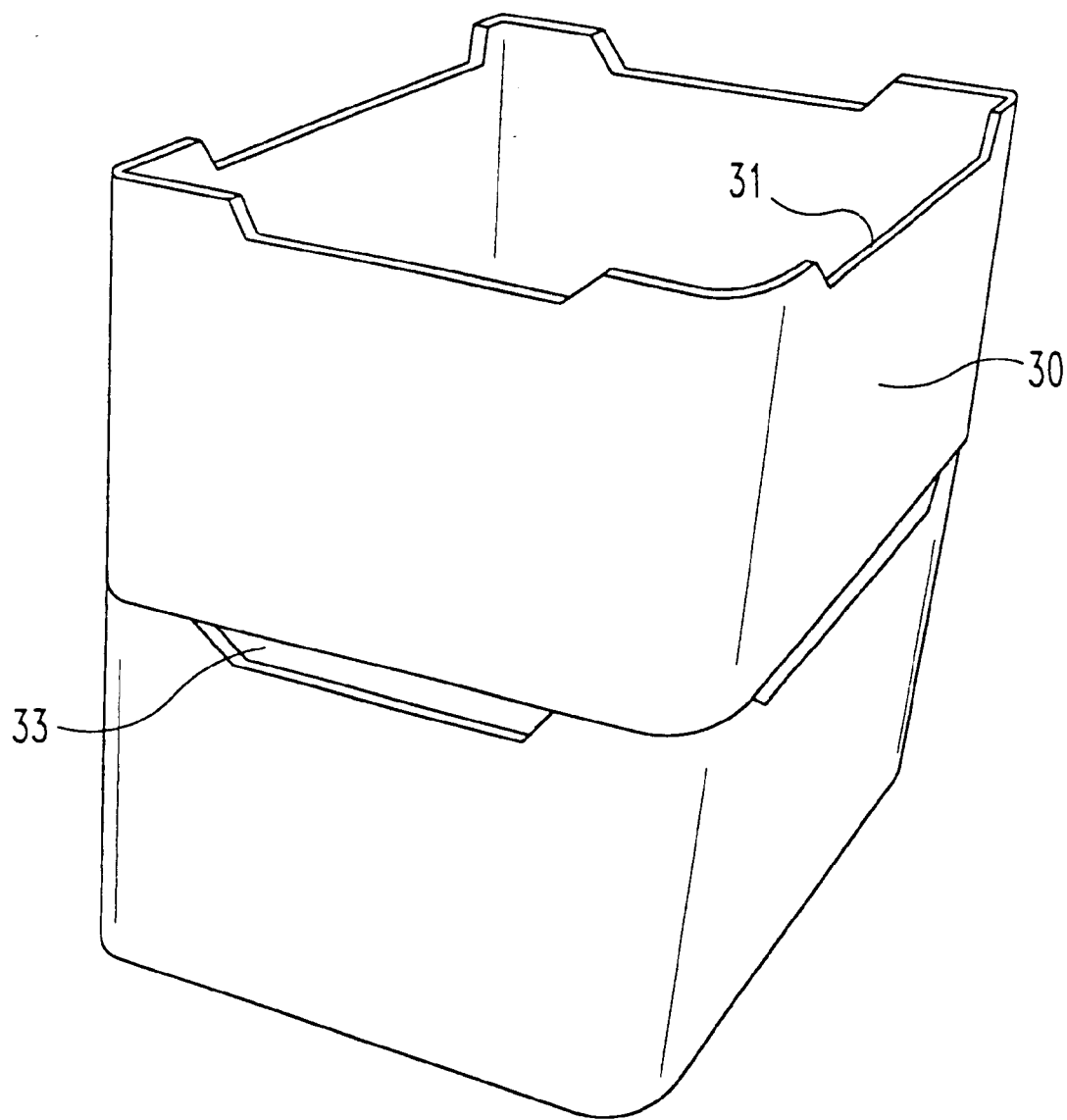
FIG. 3 is a side perspective view of stacked containers according to this invention.
Figure 4:
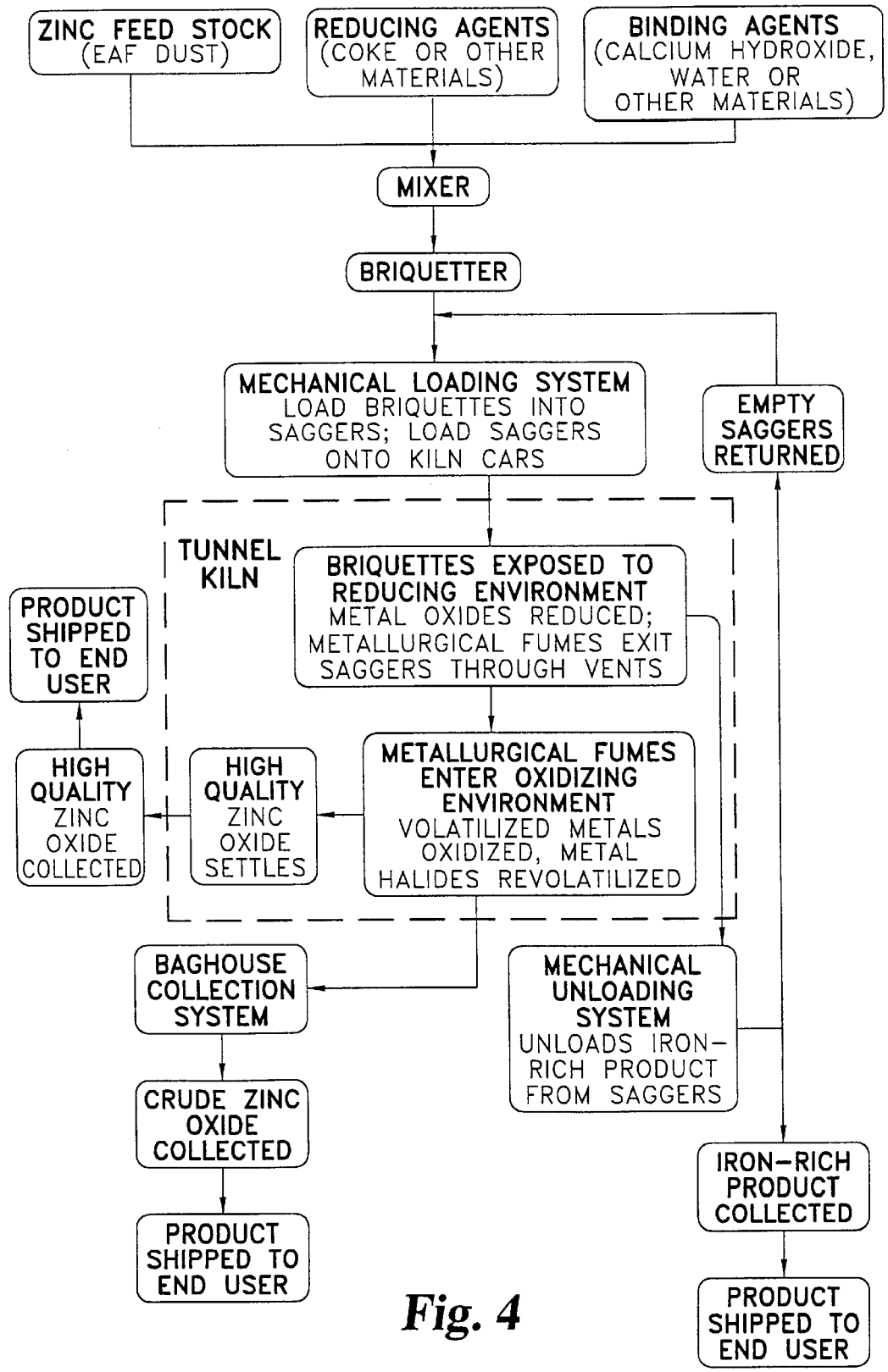
FIG. 4 is a flow diagram of a process according to one embodiment of this invention.

In one embodiment, the invention provides a process for separating and recovering a desired metal as metal oxide from raw material containing metal compounds, such as metal oxides and/or metal halides. In this particular embodiment, the process can be accomplished using assembly 10 as shown in FIGS. 1–3. The process, as applied to collecting iron-rich material and zinc oxide from EAF dust, is also depicted in the flow diagram shown in FIG. 4. The process includes heating the housing 16 to maintain a temperature zone 40 within the housing 16 at a heating temperature sufficient to expose the raw material in the container to a reaction temperature that is higher than the boiling point of the desired metal. The reaction temperature is a temperature that is sufficiently high to reduce all the desired compunds according to this invention. Preferably, the tunnel will be heated with any suitable fuel, and the heat will be applied to the saggers 30 externally by way of burner elements 24 or other suitable means. In one specific embodiment, the fuel was natural gas.

Preferably, the reaction temperature as measured inside the container will be between about 788° C. (1450° F.) and about 1260° C. (2300° F.). For embodiments separating zinc from EAF dust, the reaction temperature will be about 1210° C. (2210° F.) to about 1220° C. (2228° F.). In one particular embodiment, the reaction temperature is about 1218° C. (2225° F.). The heating temperature within the temperature zone will be sufficient to achieve the required reaction temperatures within the containers. In a particular embodiment for separating zinc from EAF dust, the heating temperature is about 1093° C. (2000° F.) to about 1315° C. (2400° F.), with a most preferred heating temperature of about 1260° C. (2300° F.). The invention contemplates heating temperatures up to the maximum temperature allowed by tunnel kiln design.

In preferred embodiments, the reductant will also serve as fuel to further heat the reaction. When a carbon-based reducing agent is used, the carbon supplements that natural gas fuel used to fire the kiln. This contributes to the energy efficiency of the invention.

In one specific embodiment, an oxidizing atmosphere is provided in the housing, generally, and in the temperature zone, specifically. The level of oxygen and/or other oxidizing agent will be high enough to provide an oxidizing atmosphere. Preferably, the oxygen level will be at least about 2.0% and up to about 21%, most preferably the oxygen level is about in the range of about 3.0% to about 7.0%. In one embodiment, the oxygen level is about 5.0%.

In one particular embodiment, the atmosphere within the tunnel is reducing, i.e. limited in oxygen or another oxidizing agent. In such embodiments, most of the metal fume reports to the bag house through the offtake member. However, in most cases, it is preferable to maintain an oxidizing atmosphere within the temperature zone because it results in very high quality metal oxides.

In one particular embodiment, the raw material is an EAF dust feed material having a high zinc content. The sagger is configured and loaded to form and maintain a reducing microclimate within the sagger. The loaded sagger 30 is then conveyed through the housing 16 to expose the raw material and the reductant to the reaction temperature. Assembly 10 is preferably configured so that the loaded container is exposed to the reaction temperature for between about 6 hours to about 24 hours. In one embodiment, this step takes about fourteen (14) hours.

According to this invention, the reaction temperatures will be selected based upon the desired metals. The reaction temperature must be higher than the boiling point of the metal. Surprisingly, in some cases, it has been found that significantly higher temperatures may be required to achieve optimal results. For example, if the desired metal is zinc, zinc vapor begins to form at about 700° C. (1292° F.). However, a temperature of about 1210° C. (2210° F.) to about 1220° C. (2228° F.) is preferred for best results when the desired metal is zinc. Zinc ferrite begins to be reduced even at low temperatures (approximately 600° C.), but even a small amount still remains at 1200° C. (2192° F.). Zinc remaining in the IRP is present in this phase ($ZnFe_2O_4$). The process can remove zinc from EAF dust by achieving a temperature of only 1000° C. (1832° F.) if twice the carbon loading is used in the briquetted mixture. This is because full reduction of the zinc ferrite would be possible under these conditions.

The increase in temperature within the sagger 30 causes the reduction process to begin. As a reducing environment is created by the oxidation of the reductant, the indirect reduction, which is the primary reduction method, of metal oxides begins. For example, in embodiments that use a reductant containing carbon, carbon is oxidized to carbon monoxide. In this way, the metal oxide is reduced to an elemental metal that vaporizes and exits the sagger 30. The present invention includes the steps of reducing metal oxides because elemental metals generally have lower boiling points than the corresponding oxides. Metals of interest in EAF dust, i.e., zinc and cadmium, have relatively low volatilization points, therefore it is advantageous to operate at a lower temperature to separate those constituents. Metal halides, such as chlorides, are not reduced by carbon, but they have lower volatilization points that facilitate their removal early in the process. It has been found that when using the processes of this invention, lead is always removed if sufficient amounts of halides are present in or added to the EAF dust.

Once the material is volatilized, the metallurgical fume will leave the sagger 30 and is exposed to the oxidizing atmosphere of the temperature zone 40. Most of the metal will be immediately re-oxidized in the kiln and settle out on the kiln cars. The rest of the metal halides remain volatile and are carried to the baghouse through the offtake member or duct 45 to a baghouse (not shown). The percentage of total zinc oxidized in the kiln will be dependent on the presence of oxidizing agents in the kiln environment. Since zinc oxide has a much higher boiling point than zinc metal, the portion of the zinc that is oxidized in the tunnel will no longer be volatile and most of it will settle out as solid. In a preferred embodiment, the kiln and kiln cars are designed so that material that settles out will fall onto the kiln car and travel with the car to the kiln exit. The surface of the kiln car may be enlarged to collect oxidized metal. Material that remains volatile or suspended in the exhaust gas, such as lead, cadmium and zinc halides, will exit the kiln and be captured in the baghouse. The baghouse product will have a high concentration of zinc and most of the lead, cadmium and halogen, such as chloride and other halide, compounds. This baghouse material has commercial value as feedstocks to zinc metal refiners or zinc chemical companies.

The sagger 30 then continues through the tunnel 17 into and beyond the cooling zone 20 and exits the tunnel. Once the saggers 30 and kiln cars 35 exit the tunnel 15, metal oxide is collected from the kiln cars 35 and saggers 30. The material remaining in the saggers after processing is an iron rich product (IRP), which, contains less than 1 wt % zinc and is approximately 55 wt % iron, about half which is metallized. IRP is a useable product with a positive market value for the cement and steel industries. In fact, the IRP, which was recovered from EAF dust, can be recycled back to the same EAF or other steel manufacturing facility.

Figure 5:
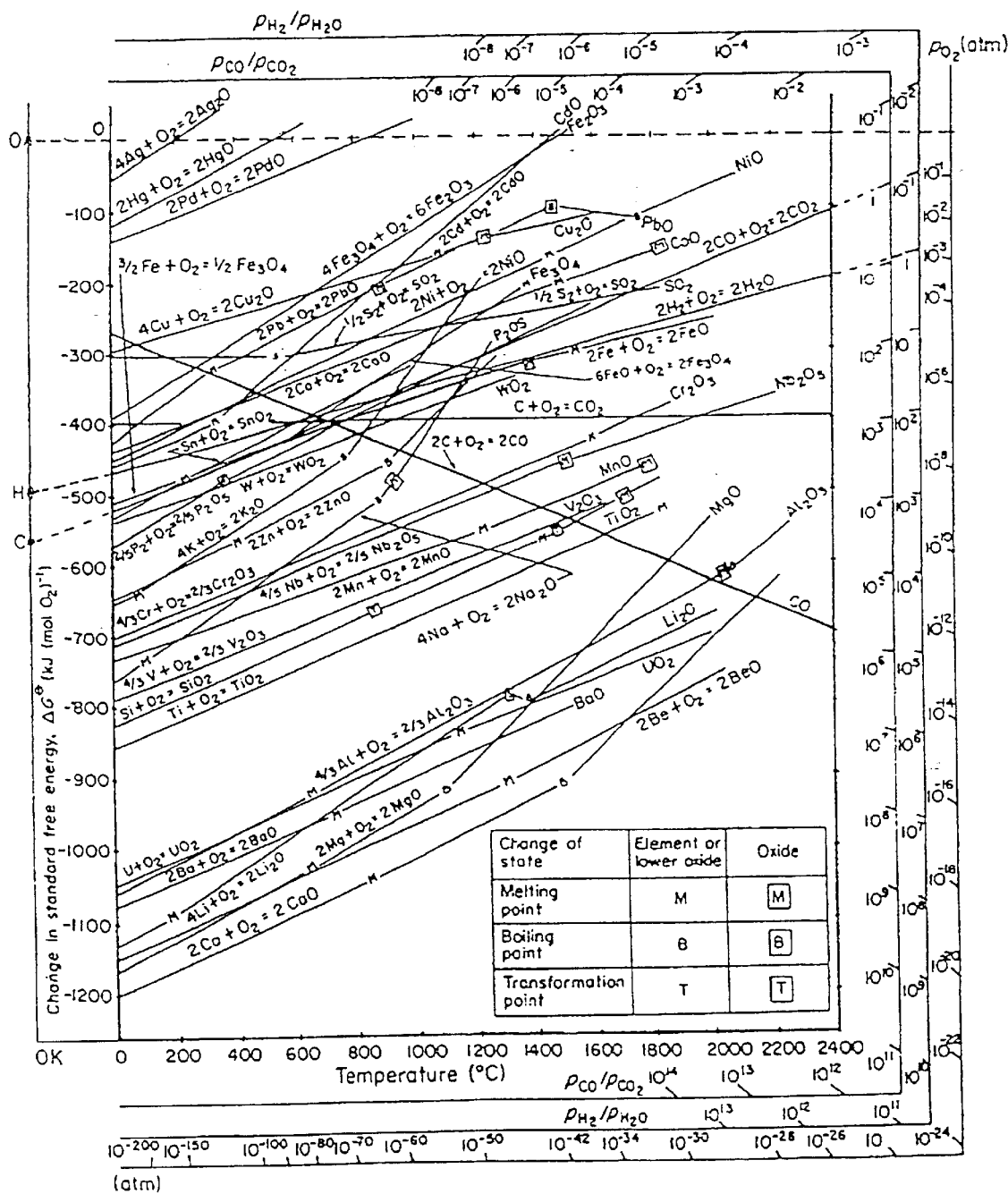
FIG. 5 is a Ellingham Diagram (standard delta G vs. T) for the formation of oxides.

The present invention employs a reducing agent to create a reducing micro-climate within the sagger 30. The reducing agent causes a reduction of the oxidation state of the metal oxide, reducing it to the metallic state by maintaining a reducing atmosphere within the sagger 30. The reducing agent converts metal oxides to their elemental form. Preferably, the reductant or reducing agent is readily available and inexpensive. The invention contemplates any suitable reductant, and such reductants are well known and commercially available. Examples include carbon sources and reductant metal oxides and metals such as aluminum. Referring now to FIG. 5, an Ellingham Diagram can be used to select an appropriate reductant.

In preferred embodiments, the reductant contains carbon, most preferably, coke or coal. In embodiments where the reductant includes carbon, between about 40 wt % and about 90 wt % carbon is added. In one particular embodiment in which the reductant includes coke, the reductant includes about 85 wt % of carbon.

When the reductant is carbon-based, the reductant is oxidized to form carbon monoxide. Of course, the term "reducing atmosphere" is relative and as such, an atmosphere may be reducing to one oxide but not another oxide. The present invention therefore contemplates that the proper reducing atmosphere will be selected to apply the invention as needed, and such selection is within the skill of the ordinary artisan. In one particular embodiment for EAF dust using coke as the reductant, the proper reducing atmosphere was achieved by maintaining an adequate partial pressure of carbon monoxide: carbon dioxide of at least about 50:1 within the sagger to begin the reduction process at 900° C. (1652° F.). As the temperature increases, the ratio of $CO:CO_2$ required is lowered. On the other hand, as the ratio is increased, indirect reduction can be accomplished at lower temperatures. For example, at a temperature of 1000° C., the required pressure is 15:1 and at 1100° C., the ratio is 5:1.

Figure 6:
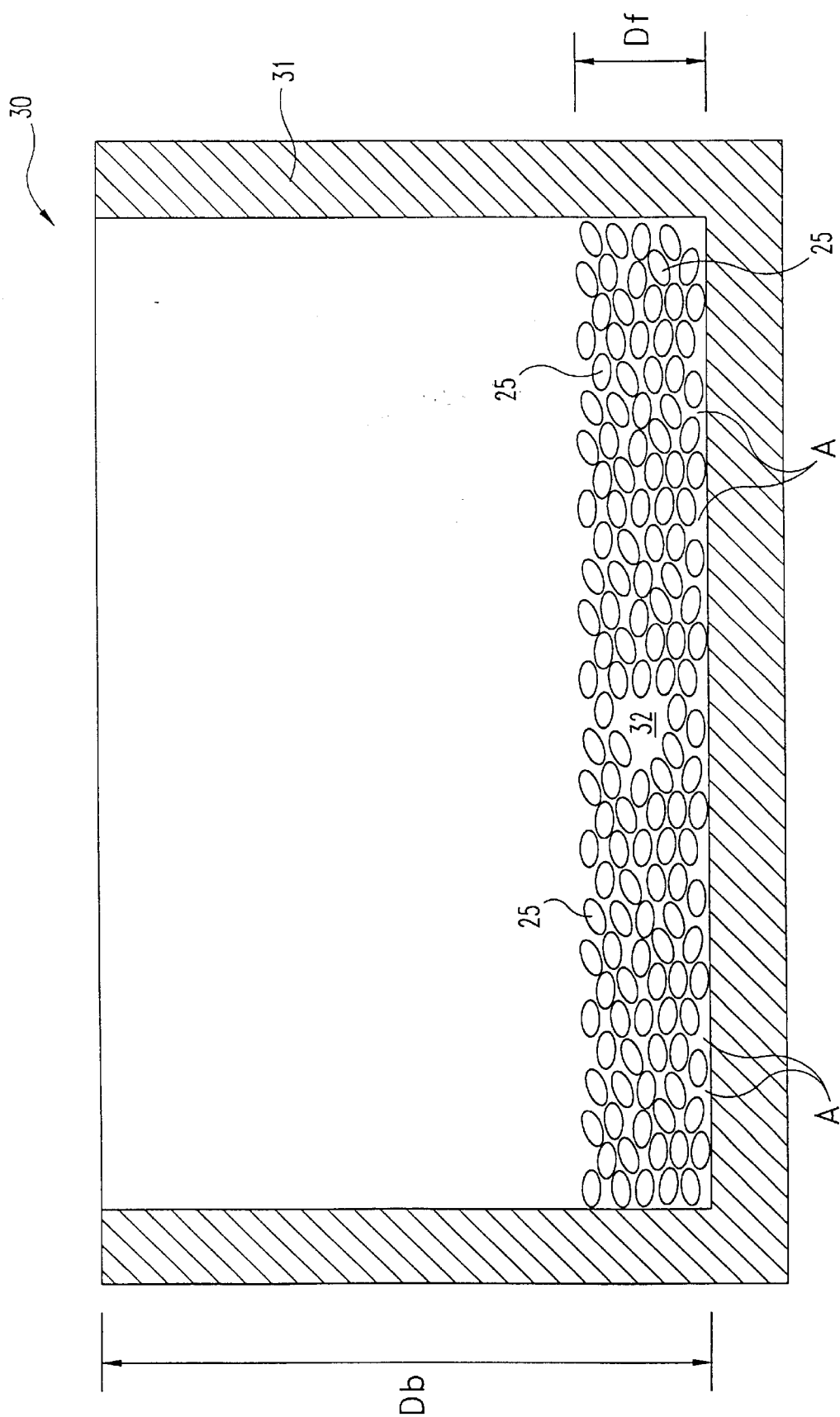
FIG. 6 is a side, cross sectional view of a container of this invention loaded with formed units according to this invention.

In one particular embodiment of the present invention, the process includes mixing the raw material with the reductant before placing them into the sagger 30. In a preferred embodiment, the process includes blending the raw material and the reductant with a binding agent to form a blend before the placing step and forming the blend into formed units 25, such as briquettes and pellets (FIG. 6). The invention contemplates any suitable binder, such as water, lime, sugar-containing materials, starch and the like. In one particular embodiment, the binder is water added in the range of about 6 wt % to about 10 wt %. In one particular embodiment, water was added in an amount of about 3 wt %. Any suitable means for mixing or blending the waste with reductant and binder is contemplated, and suitable mixers are known in the art.

Forming the feedstock into briquettes or pellets is preferred over using feedstock dust because the dust, which is typically about 1 μm in diameter, is difficult to handle. Moreover, it is believed that the chemistry upon which this invention is based will occur more readily if the raw material is compacted into formed units because the formed units ensure that there is adequate void or air space A around the feedstock material when it is loaded into the saggers 30 as shown in FIG. 6. Preferably, the beds will be loosely packed and loaded or poured randomly to allow interconnected voids to permit volatile compounds to escape and exit the sagger. The preferred volume of void space is about 10% to about 40%. The void space allows zinc and other metals to escape from the saggers 30 upon reduction and volatilization. The void spaces also allow metal halides to be vaporized and carried out of the sagger to the baghouse.

Preferably the formed units will be uniform and easy to handle. The formed units may be bricks, brickettes, pellets, and virtually any other type of formed unit. The formed units can be prepared using methods known in the art, such as injection molding extruding, briquetting or pelletizing. In the selection of the type of formed unit, the internal distance that the metallurgical fumes will need to travel to exit the unit should be considered. The invention contemplates formed units of any suitable size and shape. Generally, the formed units can range from about ¼ inch to about 8 inches in diameter or length. In one preferred embodiment, the formed units were small briquettes having the approximate dimensions: 4.28 cm (1.68 in) in length, 2.15 cm (0.85 in) in width and 1.24 cm (0.49 in) in height.

During the processes of this invention, water is driven off and reactions occur, which increases the porosity of the formed unit material. The significance of the pore space within the formed units is that it provides space for accumulation of carbon monoxide and allows indirect reduction to occur.

In one particular embodiment, a binder additive is included to improve the strength of the formed units. Improved strength allows the formed units to be moved from the location where the formed units are prepared to the processing location without damaging the formed unit. Any suitable binder additive is contemplated, including for example, lime. Such binder additives are known in the art and commercially available.

The invention contemplates that the feed stock, such as EAF dust, will be present in the initial mixture in an amount between about 65% and about 80% and the reductant will be present in an amount between about 10% to about 20% and in preferred embodiments, a binder additive, such as water, will be present in an amount between about 3% and about 20%. In one embodiment, the weight percentages in the briquettes were about 84 wt % EAF dust, about 13 wt % coke, and about 3 wt % water. In a preferred embodiment, the weight percentages in the briquettes were about 82 wt % EAF dust, about 15 wt % coke, and about 3 wt % water. In other embodiments, the raw material is about 85 wt %, the reductant is about 15 wt %, and water is a minor amount. In yet another embodiment, the blend included about 84.5 wt % raw material, about 12 wt % reductant and about 3 wt % water.

The invention contemplates any suitable container for transporting the materials through the kiln. Preferably, the container is a protective, ceramic box, such as sagger 30 as shown in FIGS. 3 and 6. Sagger 30 includes a wall member 31 defining a bed 32. Preferably, the wall member 31 defines an aperture 33 therethrough for venting the gaseous materials from the sagger. Bed 32 of sagger 30 preferably has a bed depth Db of from about 1" to about 14". The briquettes or pellets F are preferably loaded in the bed 32 to a depth Df of about 1.0 inches (2.5 cm) to about 14.0 inches (35.5 cm), with a preferred depth Df being about 4.0 inches (10 cm) to about 9.0 inches (22.9 cm). The most preferred depth Df is about 6.0 inches (15 cm).

The depth Df that the formed units F are loaded will depend, in some cases, largely on economics. A shallow depth Df will result in quicker processes that tend to destroy the containers. Deeper depths Df allow more material to be processed per run and also slow the process, which lengthens the life of the container.

Within each sagger, a reducing environment is created, even though in some embodiments the atmosphere outside the sagger in the kiln is an oxidizing environment. The present invention contemplates a sagger of any suitable material, size and configuration. In one embodiment, the saggers are composed of high alumina saggers with side vents defined in the wall member, with a bed depth of 12.7 cm (5.0 in). In another specific embodiment, the sagger was composed of cordierite, with a slightly deeper bed depth of 15.3 cm (6.0 in). In still another embodiment, larger high alumina saggers with various material bed depths, up to a maximum bed depth of 38 cm (15 in) are used. Release layers and washes can also be used and are known in the art.

In some embodiments, particularly those that use carbon reductants, the vent area or vent space ratio is a very important parameter. A vent area/material volume relationship of about 0.22 to about 0.32 square feet of vent area is recommended for each cubic foot of material being processed. The most preferred ratio is 0.25 square feet per cubic foot. Gases and metal fumes leave the sagger during the processing phase, thereby promoting reaction of the condensed phases as the system tries to reestablish equilibrium conditions. If the gases and fumes exiting the saggers are slowed by a lower vent ratio, the reaction of the condensed phases are slowed. Conversely, if the vent ratio is too large, gases escape too quickly and the proper ratio of $CO:CO_2$ (such as 50:1 at 900° C., 15:1 at 1000° C., 5:1 at 1100° C., for example) is not maintained therefore lowering the rate of reduction of the metal oxide species in the material.

Figure 7:
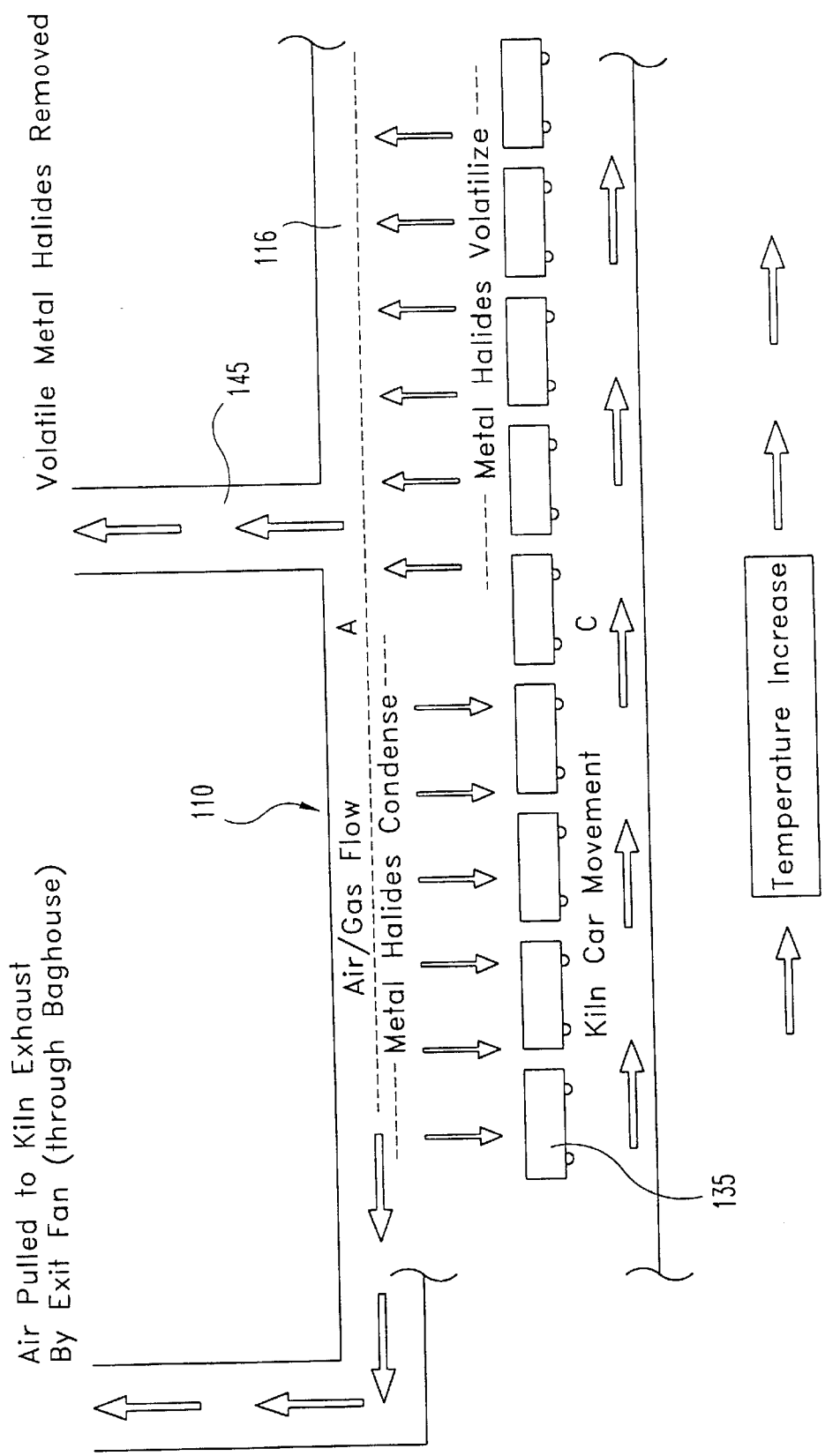
FIG. 7 is a partial side view of the interior of an assembly according to another embodiment of this invention.
Figure 8:
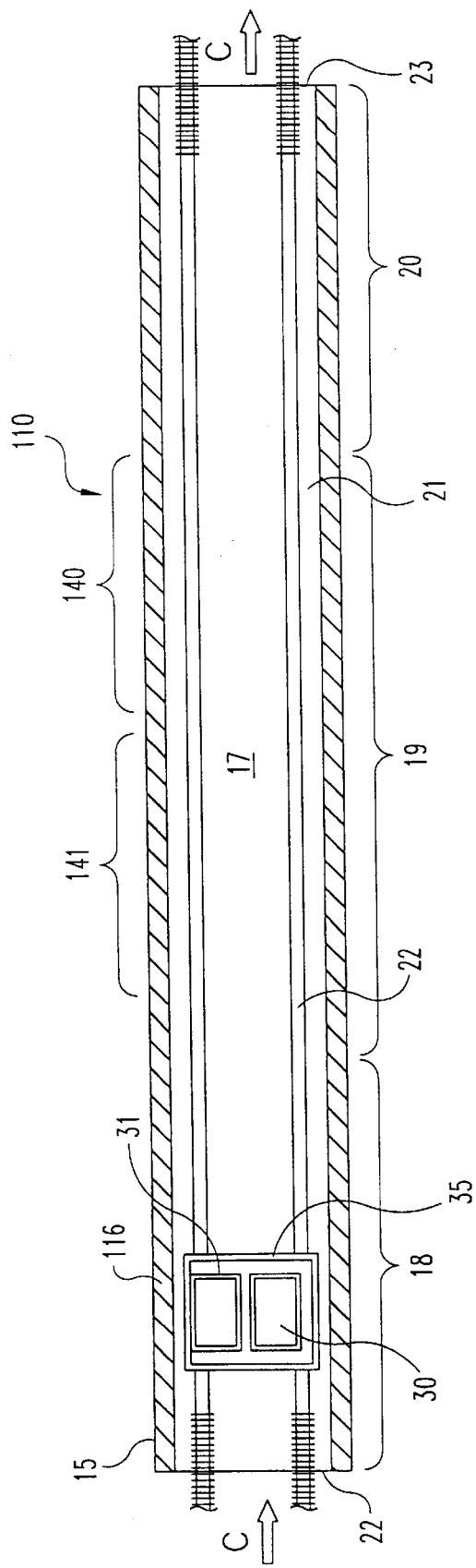
FIG. 8 is a top cross sectional view of the assembly shown in FIG. 7.

Referring now to FIGS. 7 and 8, in another embodiment, the invention includes maintaining a second temperature zone 141 within the heating zone 119 in the housing 116 in assembly 110. The second temperature zone 141 is preferably located before heating zone 140, which is maintained at the heating temperature. The location of second heating zone 141 can be adjusted as needed according to this invention. The second temperature zone 141 is maintained at a metal halide vaporization temperature, which is preferably lower than the heating temperature. In preferred embodiments, the metal halide vaporization temperature is between about 871° C. (1600° F.) and about 1093° C. (2000° F.). In one particular embodiment, the metal halide vaporization temperature is about 982° C. (1800° F.). An air flow is applied through the housing in a direction A that is opposite to a direction of travel of the container C during the conveying step. This counter current air flow can be achieved via any suitable means. In one embodiment, the means is a fan located in a bag house corresponding to feature number 45 located in the preheating zone 18 in FIG. 2. Metal halides in the raw material become volatilized to volatilized metal halides when the container 135 is conveyed through the second heating zone 141. The volatilized metal halides are collected through offlake 145. In preferred embodiments, the halide is chloride, although any suitable halide is contemplated.

In embodiments in which the raw material does not include halides, the invention may include mixing a halide with the raw material and the reductant whereby the halide reacts with metal coumpounds in the raw material to form metal halides.

This embodiment provides more complete removal of halide impurities from the zinc oxide product by preventing vaporized metal halides from traveling down the kiln with solid zinc oxide, which has a melting point near 1982° C. (3600° F.). Metal halides found in EAF dust or formed during the processes of this invention have the following boiling points: zinc chloride: 732° C. (1350° F.); lead chloride: 950° C. (1742° F.); and cadmium chloride: 960° C. (1760° F.).

Low boiling point metals can be separated and refined from higher boiling point metals by distillation and subsequent condensation to the pure metal due to their difference in vapor pressures. The change of entropy of evaporation of different metals is approximately constant, but the change in enthalpy of evaporation varies systematically within the periodic table. Metals from Group IIB, such as zinc, cadmium, and mercury, tend to be volatile, while other transition metals of Group VIA, such as chromium, molybdenum, and tungsten, have very low vapor pressures.

The range of metals that may be refined by distillation is mainly limited to those with boiling points less than 1000° C. (1832° C.). Under normal atmospheric pressure, metals having boiling points as high as zinc can be refined by distillation; under vacuum distillation, metals up to lead can be refined.

Complete separation of metals using distillation is not possible since as the mole fraction of the metal in the melt is decreased, so is its vapor pressure, eventually resulting in the evaporation of two or more metals whose vapor pressures are equal at the operating temperature. This is where selective condensation may be used to aid separation. This involves the condensation of a volatile component in a cooler zone of the tunnel kiln, which can be redistilled in a hotter zone. More volatile components remains in the vapor and can be condensed once out of the tunnel kiln.

An example of distillation by this method involves the refining of zinc. Lead and cadmium are the major impurities present in zinc produced in a blast furnace. The partial pressure of lead is much lower and the partial pressure of cadmium is much larger than the partial pressure of zinc at any given temperature. When the impure zinc is distilled in a refluxing unit, cadmium is also distilled. By controlling the maximum temperature, lead can be retained as a liquid that can be drained off. Most of the cadmium remains in the vapor phase if the vapor is cooled just sufficiently to condense the zinc.

One of the advantages of the present invention is that it is unnecessary for the valuable, yet hazardous metals and iron-rich products of EAF dust to ever become waste. The methods and assemblies of the present invention can be incorporated into existing EAF facilities to produce steel and zinc oxide and other materials to complete the manufacturing cycle. The assemblies include an electric arc furnace for producing steel and which produces electric arc furnace dust as a byproduct. The dust is collected and moved to the mixer for mixing the EAF dust with a reducing agent to form a batch. The batch is then transported from the mixer and loaded into saggers for treatment in a tunnel kiln as described above. After the saggers exit the kiln, the iron-rich product is transported back to the electric arc furnace.

The present invention shall be more correctly explained with the following examples which are to be considered merely representative of the present invention and, thus, should not be considered as limiting.

EXAMPLES

EAF DUST CHEMICAL COMPOSITION

Twenty drums of EAF dust were obtained from Nucor Steel, Crawfordsville, Ind. Grab samples were obtained from each drum and analyzed by inductively coupled plasma atomic emission spectrometry (ICP-AES) Using Method SW-846 6010B. The are shown in Table 1.

TABLE 1

ANALYSIS OF EAF DUST RECEIVED FOR PILOT TRIALS

| Drum # | % Zn | % Fe | % Mn | % Cd | % Pb | % Ca |
|---|---|---|---|---|---|---|
| 1 | 35.400 | 26.600 | 1.660 | 0.03 | 0.37 | 3.9 |
| 2 | 32.000 | 25.200 | 1.540 | 0.02 | 0.32 | 3.5 |
| 3 | 31.200 | 27.900 | 1.610 | 0.02 | 0.37 | 4.0 |
| 4 | 31.700 | 26.600 | 1.700 | 0.03 | 0.38 | 3.8 |
| 5 | 28.800 | 26.700 | 1.590 | 0.02 | 0.29 | 3.9 |
| 6 | 22.500 | 30.700 | 1.550 | 0.02 | 0.38 | 4.3 |
| 7 | 24.500 | 30.400 | 1.570 | 0.02 | 0.40 | 4.1 |
| 8 | 23.700 | 29.200 | 1.540 | 0.02 | 0.41 | 4.0 |
| 9 | 22.100 | 31.600 | 1.600 | 0.02 | 0.39 | 4.2 |
| 10 | 22.000 | 29.700 | 1.570 | 0.02 | 0.38 | 4.1 |
| 11 | 21.800 | 30.000 | 1.560 | 0.02 | 0.37 | 4.1 |
| 12 | 20.600 | 31.300 | 1.580 | 0.02 | 0.42 | 4.2 |
| 13 | 24.500 | 29.800 | 1.580 | 0.02 | 0.53 | 4.3 |
| 14 | 27.100 | 32.000 | 1.660 | 0.02 | 0.44 | 4.6 |
| 15 | 25.700 | 29.900 | 1.520 | 0.02 | 0.43 | 4.2 |
| 16 | 33.500 | 42.400 | 2.080 | 0.01 | 0.41 | 5.7 |
| 17 | 31.200 | 43.800 | 1.900 | 0.02 | 0.44 | 5.9 |
| 18 | 23.500 | 30.000 | 1.800 | 0.01 | 0.38 | 4.1 |
| 19 | 35.500 | 43.800 | 2.420 | 0.02 | 0.48 | 5.5 |
| 20 | 35.300 | 27.300 | 1.670 | 0.02 | 0.44 | 3.8 |

Notes:
Results report as weight percentages
Analyses completed by HRG ICP-AES, SW-846 6010B.

PILOT PLANT SET-UP

A pilot plant was constructed and operated to test the efficacy of the invention. The invention was applied to batches of EAF dust to determine whether the invention would yield market acceptable zinc and iron products from EAF dust. Twenty-six trials were completed to study variables such as process mix, operating temperatures and oxygen content within the kiln.

Run 1

The objectives of Run 1 were to evaluate initial use of the pilot plant components and evaluate various pelletizing methods for the material. Various sizes of pellets and a briquetted product were produced and placed into each sagger to determine the amount of zinc removed for each matrix tried. Loose EAF dust was also tested.

A mixture of EAF dust (~84.5 wt %) and fine coke (~12.5%) was prepared, and a small amount of water (~3%) was formed into specific sizes of pelletized, briquetted or unagglomerated EAF/coke mixture. Alumina saggers were loaded to a depth of about 12.7 cm (5.0 in). The saggers were placed in the kiln, and a drying step was initiated to remove moisture.

Volatilized metallurgical fumes began to exit the furnace when the temperature in the saggers was at 747° C. (1377° F.). The volatilized metallurgical fumes continued to exit the furnace throughout the run at varied intensities. When the apparent amount of volatilized metallurgical fumes exiting the furnace increased, the baghouse and duct temperatures also increased. The magnitude of the temperature increase was greatest in the duct. The total time of the heating cycle was seven hours. The maximum temperature in the saggers was 1040° C. (1900° F.) at the end of the run.

The saggers were weighed prior to the run and upon removal from the kiln at the completion of the test. Table 2 lists the initial and final weights of the material in the saggers, and the percent weight loss for each. Various samples were collected from two saggers, and from material that had dropped out within the kiln. Table 3 lists the samples collected, and the analyses of the target constituents.

TABLE 2

BEGINNING/FINAL WEIGHTS OF IRP SAMPLES
Heritage Zinc Process, Run 1

| Sample | Initial Wt. Of Sample (lbs.) | Final Wt. Of Sample (lbs.) | Wt. Loss of Sample (%) |
|---|---|---|---|
| Sagger #1 Small Pellets (5 mm) | 17.5 | 10.5 | 40.0 |
| Sagger #2 Medium Pellets (10 mm) | 15.0 | 9.0 | 40.0 |
| Sagger #3 Large Pellets (15 mm) | 11.5 | 7.0 | 39.1 |
| Sagger #4 Large Balls (75 mm) | 13.5 | 8.0 | 40.7 |
| Sagger #5 Pellet Mix (5 mm) | 12.0 | 7.0 | 41.7 |
| Sagger #6 Loose Material | 17.0 | 13.0 | 23.5 |
| Sagger #7 Briquettes | 22.5 | 15.5 | 31.1 |

Notes:
Samples weighed using pilot plant weigh scale.

TABLE 3

SAMPLE ANALYTICAL RESULTS
Heritage Zinc Process, Run 1

| Sample | % Zn | % Cd | % Cr | % Pb | % C | % Cl⁻ |
|---|---|---|---|---|---|---|
| Yellow Crystals | 76 | <0.0064 | <0.016 | <0.11 | <2.5 | <1.0 |
| Green Crystals | 82 | <0.0064 | <0.016 | <0.11 | <2.5 | <1.0 |
| White Crystals | 81 | <0.0064 | <0.016 | <0.11 | <2.5 | <1.0 |
| White Hair-like Crystals | 79 | <0.0064 | <0.016 | <0.11 | <2.5 | <1.0 |
| Sagger #2 Upper Pellet IRP | 3.7 | <0.0010 | 0.058 | <0.010 | N/A | N/A |
| Sagger #2 Lower Pellet IRP | 12 | <0.0010 | 0.055 | 0.27 | N/A | N/A |
| Sagger #7 Upper Briquette IRP | 6.5 | <0.0010 | 0.054 | 0.025 | N/A | N/A |
| Sagger #7 Lower Briquette IRP | 19 | <0.0010 | 0.038 | 0.32 | N/A | N/A |

Notes:
Samples were prepared for analyses by acid digestion (Modified SW-846 3050B).
Metals analyses completed by HRG ICP-AES and CLO ICP-AES.
Inorganic anions analyses completed by CLO ion chromatography.

All materials, with the exception of the loose material and the briquettes, exhibited a weight loss of approximately 40%. The larger particles, specifically the 15 mm and 75 mm size material, appeared to not be fully processed (still had brownish appearance). Some of the weight loss is attributed to the fact that more water had to be used in forming these sizes. Conversely, the unagglomerated material had no additional water added to the mixture, and it exhibited the smallest weight loss. The actual weight loss attributed to specific reasons, i.e. moisture, removal of metallurgical fumes or carbon utilization, could not be determined for this run.

Weight loss also occurred in the material in each sagger due to the reduction and volatilization of zinc from the material. While the some of the weight loss in the 15 mm and 75 mm particles was assumed to be water weight lost, the weight loss associated with the smaller particles (5 and 10 mm) were assumed to be associated with zinc being removed from the material. The briquetted material exhibited a lower weight loss, which is reflected in the lower zinc removal rates for upper and lower sections.

The unagglomerated material had a fine brown dust over white dust, which in turn was over blackened material. The three layers were approximately 5 mm thick; the remaining material appeared unaffected. However, there was not hardening of the layers at the top of the material.

Upper sections of pellet and briquette residues exhibited a better rate of zinc removal than lower sections of each.

Removal from the 10-mm pellets was 89% for the upper section versus 62% removal for lower section; the briquettes exhibited 80% removal for the upper section sample versus 40% removal for the lower section sample.

Various crystalline material found throughout the saggers and kiln were analyzed and found to contain very high levels of zinc. As can be seen in the results shown in Table 3 most were virtually pure zinc oxide.

Figure 9:
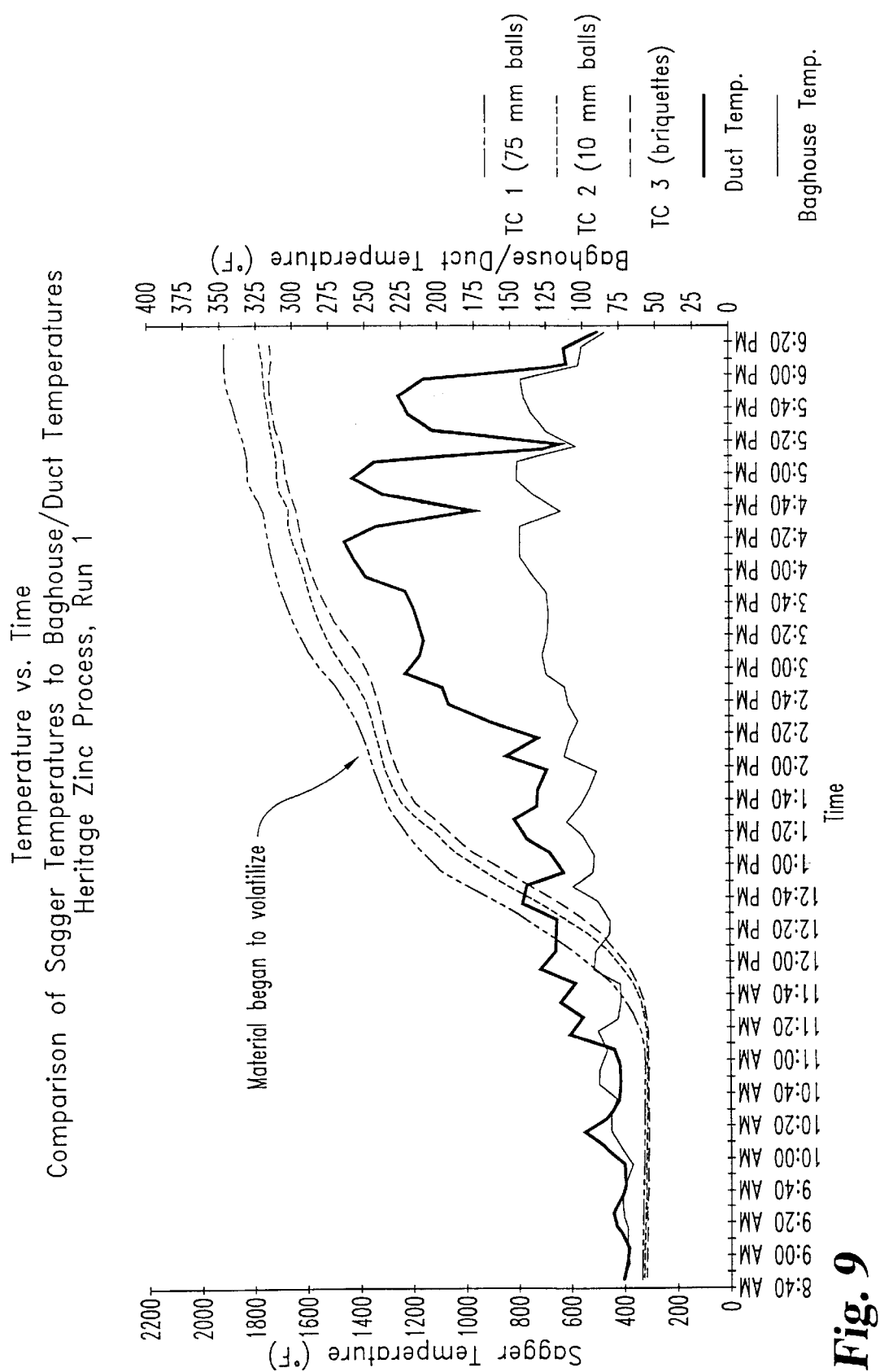
FIG. 9 is a chart showing the temperature profile for Run 1.
Figure 10:
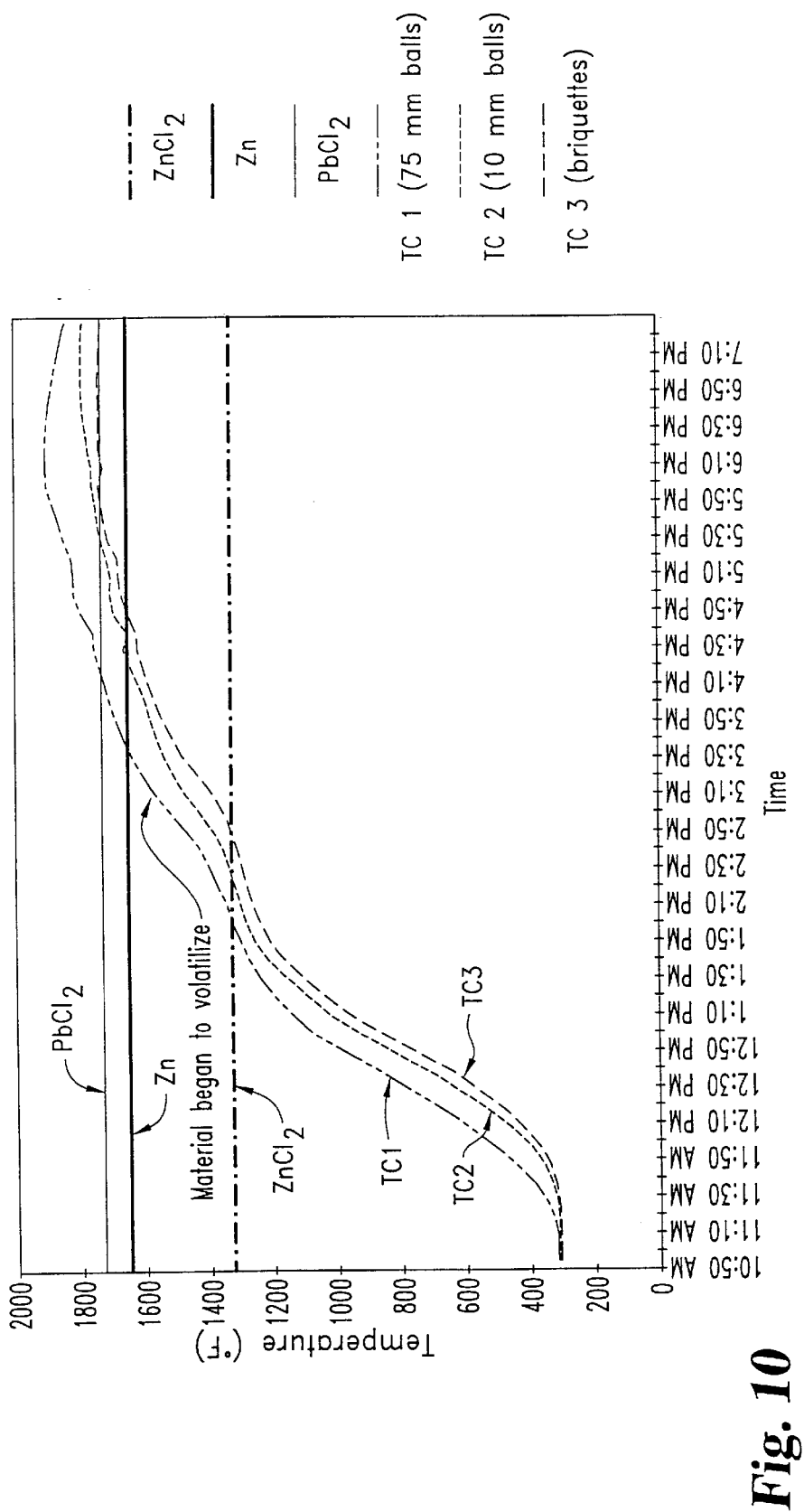
FIG. 10 is a chart showing the comparison of sagger temperatures to various volatilization points.

FIG. 9 illustrates the baghouse and duct temperature increases plotted with the sagger temperature increases. The peaks at which an increased amount of material was exiting the furnace, and consequential increase of baghouse temperature, compare well to volatilization temperatures for compounds expected to be in the EAF dust mixture. This is illustrated in FIG. 10. This suggests that cut points could be made, whereby lead and chloride compounds can be collected before zinc is volatilized.

The results of Run 1 indicated that the size of the material in the sagger made some difference in the ability to recover zinc from the EAF dust. However, it was apparent that material had not fully reacted. Therefore the decision was made to increase the upper temperature limit for the next run. Data collected indicated that better zinc removal rates could be obtained with a higher temperature limit. With production of pellets in the batch pelletizer being difficult, it was decided to produce briquettes exclusively for the next run. Available pore space in each sagger appeared to be important, therefore unagglomerated material was no longer considered an option to use for the process.

Run 2

The purpose of Run 2 was to collect duct samples to establish when various materials are removed from the EAF mixture. A determination of the temperature profile throughout the saggers in the kiln was also an objective of this test. Multiple analyses of the IRP were also completed to determine zinc removal efficiency.

The procedures for Run 2 were the same as Run 1 except that the EAF dust mixture was formed into briquettes and ceramic wool was used to collect samples of dust in the duct leading to the baghouse. In addition, thermocouples (TC1) were placed inside the saggers to monitor the internal temperature of the saggers.

This test provided early indications that zinc removal from the briquetted material had improved, but there was a large variation by depth of material. There appeared to be better zinc removal from samples collected from the bottom of the saggers as opposed to samples collected from the top of the saggers. Analyses of the samples captured on the ceramic wool gave an indication of zinc, cadmium, and lead concentrations that were leaving the furnace. Lead was detected in all grab samples, so it was assumed that it would be unlikely to fractionally distill the lead and zinc. However, it was clear that a better method was needed for determining what metals were being volatilized and where best to sample. Weight loss of material in the saggers was generally 45%, with one exception (41%). Weight data are listed in Table 4 for the test run. Table 5 lists descriptions of samples that were collected, and Tables 6 and 7 show the analytical results for the material remaining in the saggers and material obtained from the ceramic wool at the duct.

TABLE 4

BEGINNING/FINAL WEIGHTS OF IRP SAMPLES
Heritage Zinc Process, Run 2

| Sample | Initial Wt. Of Sample (lbs.) | Final Wt. Of Sample (lbs.) | Wt. Loss of Sample (%) |
|---|---|---|---|
| Sagger #8 | 23.0 | 12.5 | 45.7 |
| Sagger #9 | 23.5 | 13.0 | 44.7 |
| Sagger #10 | 23.0 | 12.5 | 45.7 |
| Sagger #11 | 23.5 | 13.0 | 44.7 |
| Sagger #12 | 24.0 | 13.0 | 45.8 |
| Sagger #13 | 24.5 | 14.5 | 40.8 |

Notes:
Samples weighed using pilot plant weigh scale.

TABLE 5

LIST OF SAMPLES COLLECTED
Heritage Zinc Process, Run 2

| Sample | Sample description |
|---|---|
| TC1 = 1129 F | white, light yellow, gray/black dust collected |
| TC1 = 1637 F | white, gray/black dust collected |
| TC1 = 1728 F | white, gray/black dust collected |
| TC1 = 1763 F | white, yellow, gray/black dust collected |
| TC1 = 1775 F | white, yellow, green, gray/black dust collected |
| TC1 = 1800 F | white, yellow, green, brown gray/black dust collected |
| TC1 = 1805 F | yellow, gray/black chunk |
| TC1 = 1816 F | white, light yellow, green, gray/black dust collected |
| TC1 = 1847 F | white, green, gray/black dust collected |
| TC1 = 1880 F | white, green, gray/black dust collected |
| Sagger 8, outside half, top layer | oxidized layer on top of brickette |
| Sagger 8, outside half, middle layer | blackened material |
| Sagger 8, outside half, bottom layer | blackened material |
| Sagger 8, inside half, top layer | oxidized layer on top of brickette |
| Sagger 8, inside half, middle layer | blackened material |
| Sagger 8, inside half, bottom layer | blackened material, slightly metalized appearance |
| Sagger 9, center, top layer | oxidized layer on top of brickette |
| Sagger 9, center, middle layer | blackened material |
| Sagger 9, center, bottom layer | blackened material |
| Sagger 10, outside half, top layer | oxidized layer on top of brickette |
| Sagger 10, outside half, middle layer | blackened material |
| Sagger 10, outside half, bottom layer | blackened material |
| Sagger 10, inside half, top layer | oxidized layer on top of brickette |
| Sagger 10, inside half, middle layer | blackened material |
| Sagger 10, inside half, bottom layer | blackened material |

Notes:
All saggers had oxidized brickettes facing upward, remaining material was blackened, weakly cemented together.
Top two saggers (#10, and #13) had significantly more fine long white crystals than others. All saggers had some fine long white crystals.
Only material noted at bottom of furnace was some blackened material, and chunks of material broken of from vent area.
No oxide dust noted on bottom; white oxide/chloride (?) crust on glass walls, crust gets thicker closer to burners.

TABLE 6

IRP SAMPLE ANALYTICAL RESULTS
Heritage Zinc Process, Run 2

| Sample | % Zn | % Cd | % Cr | % Pb | % C | % Cl⁻ | % F⁻ |
|---|---|---|---|---|---|---|---|
| Sagger #8 In Top | 4.3 | <0.0010 | 0.11 | <0.010 | 0.013 | N/A | N/A |
| Sagger #8 In Middle | 0.38 | <0.0010 | 0.061 | 0.05 | 4.6 | N/A | N/A |
| Sagger #8 In Bottom | 1.6 | <0.0010 | 0.063 | <0.010 | 1.1 | N/A | N/A |
| Sagger #8 Out Top | 7.5 | <0.0010 | 0.15 | <0.010 | 0.010 | N/A | N/A |
| Sagger #8 Out Middle | 0.27 | <0.0010 | 0.059 | <0.010 | 4.9 | N/A | N/A |
| Sagger #8 Out Bottom | 0.15 | <0.0010 | 0.070 | <0.010 | 3.1 | N/A | N/A |
| Sagger #9 Center Top | 3.0 | <0.0010 | 0.076 | <0.010 | 0.28 | N/A | N/A |
| Sagger #9 Center Middle | 2.8 | <0.0010 | 0.075 | <0.010 | 0.14 | N/A | N/A |
| Sagger #9 Center Bottom | 0.95 | <0.0010 | 0.071 | 0.17 | 2.0 | N/A | N/A |
| Sagger #10 In Top | 6.1 | <0.0010 | 0.14 | <0.010 | 0.010 | N/A | N/A |
| Sagger #10 In Middle | 0.22 | <0.0010 | 0.063 | 0.03 | 5.8 | N/A | N/A |
| Sagger #10 In Bottom | 0.25 | <0.0010 | 0.075 | <0.010 | 2.9 | N/A | N/A |
| Sagger #10 Out Top | 2.4 | <0.0010 | 0.098 | <0.010 | 0.010 | N/A | N/A |
| Sagger #10 Out Middle | 0.37 | <0.0010 | 0.067 | <0.010 | 2.9 | N/A | N/A |
| Sagger #10 Out Bottom | 0.11 | <0.0010 | 0.073 | <0.010 | 3.0 | N/A | N/A |
| Baghouse Dust | 66 | 0.057 | <0.0033 | 0.99 | 4.3 | 5.8 | <1.6 |

Notes:
All samples noted were collected from the residue remaining in saggers.
Samples were prepared for analyses by acid digestion (Modified SW-846 3050B).
Analyses completed by HRG ICP-AES.

TABLE 7

DUCT GRAB SAMPLE ANALYTICAL RESULTS
Heritage Zinc Process, Run 2

| Sample | % Zn | % Cd | % Cr | % Pb |
|---|---|---|---|---|
| TC1 = 1129 F | 3.7 | 0.013 | <0.0020 | 0.10 |
| TC1 = 1637 F | 8.0 | <0.0010 | <0.0020 | 0.065 |
| TC1 = 1728 F | 39 | <0.0010 | <0.0020 | 0.30 |
| TC1 = 1763 F | 61 | <0.0010 | <0.0020 | 0.22 |
| TC1 = 1775 F | 77 | <0.0010 | <0.0020 | 0.34 |
| TC1 = 1800 F | 67 | <0.0010 | <0.0020 | 0.19 |
| TC1 = 1805 F Overhang | 71 | <0.0010 | <0.0020 | 0.035 |
| TC1 = 1816 F | 82 | <0.0010 | <0.0020 | 0.14 |
| TC1 = 1847 F | 73 | <0.0010 | <0.0020 | 0.23 |
| TC1 = 1880 F | 71 | <0.0010 | <0.0020 | 0.13 |

Notes:
Samples were prepared for analyses by acid digestion (Modified SW-846 3050B).
Metals analysis completed by CLO ICP-AES.

It was concluded from Run 2 that a higher temperature needed to be reached for better zinc removal from the IRP. There was a concern that the temperature in the top sagger was lagging behind the bottom sagger, at times by approximately 70° C. (125° F.). Investigation of temperature differences between saggers would be expanded to look at different levels beyond what was investigated for this run.

Run 3

The purpose of Run 3 was to attain a higher sagger temperature to facilitate more complete removal of zinc in the IRP. Additionally, differences in sagger temperatures would be studied vertically and horizontally in the kiln during the run.

TABLE 8

SEM-EDX ANALYSIS OF IRP
Heritage Zinc Process, Run 3

| Detected Element (as oxide) | Approx. Wt % of Sample |
|---|---|
| ZnO | <0.1 |
| $Cu_2O$ | 0.5 |
| CoO | <0.1 |
| $Fe_2O_3$ | 71.1 |
| MnO | 5.7 |
| $Cr_2O_3$ | 0.5 |
| $TiO_2$ | 0.1 |
| CaO | 11.5 |
| $K_2O$ | <0.1 |
| Cl | <0.1 |
| $SO_3$ | 1.9 |
| $P_2O_5$ | 0.2 |
| $SiO_2$ | 3.8 |
| $Al_2O_3$ | 1.1 |
| MgO | 3.5 |

Notes:
Material crushed to −200 Mesh, Taylor Series.
Sample was a composite from all saggers run.

TABLE 9

XRD ANALYSIS OF IRP
Heritage Zinc Process, Run 3

| Detected Element (as oxide) | Relative Concentration of Sample |
|---|---|
| FeO - Wuestite | major |
| $Fe_3O_4$ - Magnetite* | major |
| Fe - Iron | major |
| $Fe_2O_3$ - Hematite | minor |
| $CaFe_3O_5$ | minor |
| $Ca_2SiO_4$ - Larnite | minor |

Notes:
This pattern is also consistent with $Mn_3O_4$ and $MgFe_2O_4$ and may be a mixture of these phases.
Scan data: 3° to 90° 2 theta at 0.02° per second
Relative concentrations represented as major (>15%), minor (5%–15%) and trace (<5%).
Material crushed to −325 mesh
Sample was a composite from all saggers run.

TABLE 10

ANALYSIS OF GRAB SAMPLES FROM CERAMIC WOOL CAPTURE
Heritage Zinc Process, Run 3

| Sample* | % Zn | % Cd | % Cr | % Pb | % Mg | % Mn | % Cl⁻ | % F⁻ |
|---|---|---|---|---|---|---|---|---|
| 1395 F | 21 | 0.0091 | <0.0020 | 0.16 | N/A | N/A | <5.2 | <2.0 |
| 1550 F | 94 | 0.0047 | <0.0020 | 0.43 | N/A | N/A | <5.2 | <2.0 |
| 1600 F | 55 | <0.0010 | <0.0020 | 0.18 | N/A | N/A | <5.2 | <2.0 |
| 1705 F | 68 | <0.0010 | <0.0020 | 0.11 | N/A | N/A | <5.2 | <2.0 |
| 1740 F | 66 | <0.0010 | <0.0020 | 0.14 | N/A | N/A | <5.2 | <2.0 |
| 1750 F | 62 | <0.0010 | <0.0020 | 0.14 | N/A | N/A | <5.2 | <2.0 |
| 1757 F | 61 | <0.0010 | <0.0020 | 0.065 | N/A | N/A | <5.2 | <2.0 |
| 1777 F | 54 | <0.0010 | <0.0020 | 0.089 | N/A | N/A | <5.2 | <2.0 |
| 1784 F | 67 | <0.0010 | <0.0020 | 0.14 | N/A | N/A | <5.2 | <2.0 |
| 1811 F | 41 | <0.0010 | <0.0020 | 0.040 | N/A | N/A | <5.2 | <2.0 |
| 1849 F | 64 | <0.0010 | <0.0020 | 0.061 | N/A | N/A | <5.2 | <2.0 |
| 2054 F | 58 | <0.0010 | <0.0020 | 0.11 | <0.040 | 0.002 | <5.2 | <2.0 |
| 2175 F | 49 | <0.0010 | <0.0020 | 0.038 | <0.040 | 0.002 | <5.2 | <2.0 |
| 2189 F | 67 | <0.0010 | <0.0020 | 0.016 | <0.040 | <0.0020 | <5.2 | <2.0 |
| Stack Drop Out | 0.031 | <0.0010 | 0.0041 | <0.010 | N/A | N/A | <5.2 | <2.0 |

Notes:
Samples were prepared for analyses by acid digestion (Modified SW846 3050B).
Metals analyses completed by CLO ICP-AES.
Inorganic anions analyses completed by CLO ion chromatography.
*Temperature of TC1 when sample was collected Very good zinc removal was obtained with this test run, with analyses showing from 0.02% to 0.14% zinc remaining in the IRP as shown in Table 8. Lead and cadmium were not detected in the IRP, and chromium was not detected in the baghouse dust as shown in Table 10.

The volume of briquettes lost in the saggers at the end of the test run was approximately 70%. Weight percentage lost ranged from 46% to 49%. The material was easily removed from the high alumina saggers as single blocks. The analytical work completed by all sources on the IRP indicated that a product was produced with potential to be used in a variety of applications due to low zinc, lead and cadmium values. Analytical results of the IRP are shown in Table 9. In addition, it was found that the process converted a significant percentage of the total iron to the metallized form.

A large quantity of carbon was observed in the baghouse material collected. As it was determined at a later point, the run was conducted under reducing conditions, therefore this resulted in the incomplete combustion of the carbon from the process.

Run4

The purpose of Run 4 was to get a better understanding of metallurgical fumes volatilizing out of the EAF dust mixture. This was to be done by running one sagger only with briquetted material, and monitoring the temperature at several points within that one sagger.

This test provided very specific temperature plateaus where volatilization occurred from the EAF dust mixture. Fourteen distinctive points can be identified where changes in process temperature occurred. However, more definitive chemical analyses needed to be performed to identify compounds exiting at each temperature point. The location where grab samples were being collected had the problem of reaching temperatures where material caught on the ceramic wool may be revolatilizing. Although there appeared to be peaks in concentrations of target constituents, the data collected was only being viewed as a general trend and may not be what is actually occurring.

The briquetted EAF dust mixture experienced a weight loss of 47.1% during the test run. There was still 6.45% zinc remaining in the IRP. Analytical results are shown in Table 11. The maximum temperature for optimum removal appeared to be higher than what was achieved for the run.

TABLE 11

ANALYSIS OF GRAB SAMPLES and IRP
Heritage Zinc Process, Run 4

| Sample | % Zn | % Cd | % Cr | % Pb | % Fe | % C | % Cl⁻ | % F⁻ |
|---|---|---|---|---|---|---|---|---|
| TC2 = 1301 | 1.7 | <0.0025 | <0.0050 | <0.025 | N/A | N/A | <12 | <4.9 |
| TC2 = 1460 | 1.2 | <0.0025 | <0.0050 | 0.014 | N/A | N/A | 5.2 | <4.9 |
| TC2 = 1480 | 4.0 | <0.0025 | <0.0050 | 0.034 | N/A | N/A | 2.5 | <4.9 |
| TC2 = 1590 | 7.6 | <0.0025 | <0.0050 | 0.038 | N/A | N/A | 2.3 | <4.9 |
| TC2 = 1600 | 8.7 | <0.0025 | <0.0050 | 0.036 | N/A | N/A | 4.2 | <4.9 |
| TC2 = 1650 | 12 | <0.0025 | <0.0050 | 0.10 | N/A | N/A | <12 | <4.9 |
| TC2 = 1692 | 15 | <0.0025 | <0.0050 | 0.10 | N/A | N/A | <12 | <4.9 |
| TC2 = 1745 | 41 | <0.0025 | <0.0050 | 0.15 | N/A | N/A | <12 | <4.9 |
| TC2 = 1764 | 50 | <0.0025 | <0.0050 | 0.19 | N/A | N/A | <12 | <4.9 |
| TC2 = 1793 | 42 | <0.0025 | <0.0050 | 0.062 | N/A | N/A | <12 | <4.9 |
| TC2 = 1836 | 22 | <0.0025 | <0.0050 | 0.034 | N/A | N/A | <12 | <4.9 |
| TC2 = 1851 | 66 | <0.0025 | <0.0050 | 0.10 | N/A | N/A | <12 | <4.9 |
| TC2 = 1913 | 50 | <0.0025 | <0.0050 | 0.13 | N/A | N/A | <12 | <4.9 |
| TC2 = 2024 | 66 | <0.0025 | <0.0050 | 0.13 | N/A | N/A | <12 | <4.9 |
| TC2 = 2074 | 48 | <0.0025 | <0.0050 | 0.084 | N/A | N/A | <12 | <4.9 |

TABLE 11-continued

ANALYSIS OF GRAB SAMPLES and IRP
Heritage Zinc Process, Run 4

| Sample | % Zn | % Cd | % Cr | % Pb | % Fe | % C | % Cl⁻ | % F⁻ |
|---|---|---|---|---|---|---|---|---|
| TC2 = 2130 | 37 | <0.0025 | <0.0050 | 0.070 | N/A | N/A | <12 | <4.9 |
| Sagger #22 White Crystals | 35 | <0.0055 | 0.011 | <0.055 | N/A | N/A | <28 | <11 |
| Sagger #22 Brown Crystals | 36 | <0.0025 | <0.0050 | <0.01 | 0.10 | N/A | <12 | <4.9 |
| Sagger #22 IRP Residue | 6.4 | <0.0025 | 0.14 | <0.025 | 49 | 0.035 | N/A | N/A |
| Baghouse Dust | 62 | 0.018 | <0.0050 | 0.92 | N/A | N/A | <12 | <4.9 |

Notes:
Samples were prepared for analyses by acid digestion (Modified SW-846 3050B).
Metals analyses completed by CLO ICP-AES.
Carbon analyses completed by CLO total carbon analyzer.
Inorganic anions analyses completed by CLO ion chromatography.

Run 5

Due to operational problems with the plant equipment, the test run was aborted several hours after the run was started.

Run 6

Operational problems with plant equipment again forced an early termination of the test run.

Run 7

The purpose of Run 7 was to test a larger sagger, in order to assess the ability to obtain good zinc removal with deeper bed depths. The larger sagger was a high alumina 16"×16"×16". Thermocouples were used to assess temperature profile across the bed.

Results obtained from an X-ray Diffraction (XRD) analysis (Table 12) confirmed that halide compounds being formed were reporting to the baghouse, with virtually pure zinc oxide remaining in the furnace dropout material. It was determined the chlorides present were complexing with the zinc as a hydroxyhalide compound. Results of SEM-EDX analysis are show in Table 13.

TABLE 12

XRD ANALYSIS OF BAGHOUSE/FURNACE DROPOUT MATERIAL
Heritage Zinc Process, Run 7

| Detected Compound | Furnace Dropout | Baghouse Dust |
|---|---|---|
| ZnO - Zincite | major | major |
| $Zn_5(OH)_8Cl_2 \cdot H_2O$ - Simonkolleite | | minor |

Notes:
Scan data: 3° to 90° 2 theta at 0.02° per second
Relative concentrations represented as major (>15%), minor (5%–15%) and trace (<5%).
Material pulverized to −325 mesh.

TABLE 13

SEM-EDX ANALYSIS OF BAGHOUSE/FURNACE DROPOUT MATERIAL
Heritage Zinc Process, Run 7

| Detected Element (as oxide) | Furnace Dropout (wt %) | Baghouse Dust (wt %) |
|---|---|---|
| ZnO | 95.6 | 96.0 |
| $Cu_2O$ | 0.9 | 0.6 |
| CoO | <0.1 | 0.2 |
| $Fe_2O_3$ | 0.5 | 0.3 |
| MnO | 0.3 | <0.1 |
| $Cr_2O_3$ | 0.5 | <0.1 |
| $TiO_2$ | 0.3 | <0.1 |
| CaO | 0.2 | <0.1 |
| $K_2O$ | <0.1 | 0.4 |
| Cl | <0.1 | 1.6 |
| $SO_3$ | <0.1 | 0.5 |
| $P_2O_5$ | 0.3 | <0.1 |
| $SiO_2$ | 0.4 | 0.3 |
| $Al_2O_3$ | 0.3 | <0.1 |
| MgO | 0.6 | <0.1 |

Notes:
Material crushed to −325 Mesh, Taylor Series.
Sample was a composite from all saggers run.

It did not appear that specific plateaus were reached at a stage where compounds or metals would volatilize at specific points. There was such a difference in the temperature profile that specific plateaus were not achieved simultaneously. There were peaks on the baghouse/duct temperatures. However, it is believed the major portion of the rise was due to a high temperature reached in the kiln itself. These same peaks occurred, when the furnace temperature was accelerating at the beginning of the run, and had to be adjusted.

The vent space appeared to be overwhelmed because accretions were formed at the vent areas of the sagger. The accretions formed ranged from very thin, brittle sections, easily broken by slightly touching, to a more stable, yet still weak, structure. There was also a significant amount of material fallen outside the vents, on the kiln floor and lower walls.

It appeared from the run that the sagger vents were overwhelmed by zinc exiting the sagger, and material remained in the sagger because it could not exit. It was determined that the run would be repeated, with increased vent space to facilitate removal of the volatilized zinc.

Run 8

The purpose of this run was to attempt to achieve good zinc removal from a deeper bed depth, while ensuring adequate venting is provided to facilitate removal of the volatilized zinc. Previous vent space dimensions were gathered from the small saggers used during previous runs, and the amount of vent space required per amount of briquettes was determined. The vent space in a large high alumina sagger was increased by a percentage of this factor. The run would determine if this would be adequate to address the venting problem. IRP analysis is shown in Table 14.

TABLE 14

XRF ANALYSIS OF IRP
Heritage Zinc Process, Run 8

| Detected Element | Approx. Wt % of Sample (as oxide) |
|---|---|
| Fe | 33.63 |
| Zn | 24.61 |
| Mg | 5.045 |
| Ca | 4.396 |
| Si | 2.50 |
| Mn | 1.63 |
| Al | 0.923 |
| K | 0.577 |
| S | 0.185 |
| Pb | 0.163 |
| Cr | 0.127 |
| Cu | 0.116 |
| Cl | 0.103 |
| Ti | 0.0359 |
| Sn | 0.0313 |
| Ba | 0.0099 |
| Sb | 0.0042 |
| Cd | ND |

Notes:
Material crushed to −200 Mesh, Taylor Series.
Analysis part of XRF demonstration
ND = Not Detected A significant amount of zinc still remained in the composite IRP sample that was collected for XRF analysis. From temperature data and visual observations, it was apparent that the material being volatilized in the kiln was not making it out, and seemed to slow the rate of reaction for the process. It was noted that accretions were still inhibiting removal of metallurgical fumes. However, the addition of the holes in the side walls of the sagger did appear to help temperatures stay higher in the bottom of the sagger, showing that the process was proceeding, even if it was slower than the rate of temperature increase typically seen with smaller saggers. A layer of dropout material, less than 1.27 cm (0.5 in) was observed on most of the kiln floor; no buildup was evident on the kiln walls. The amount of dropout material appeared to be somewhat less than Run 7. It was apparent that further increases to vent space were required. Therefore, the plan for a future run would increase the vent area a significant amount.

Run 9

The purpose of the Run 9 was to test the large high alumina sagger with additional vent space beyond what was previously attempted in Run 8. Use of the larger sagger would assess the ability to obtain good zinc removal with deeper bed depths. Thermocouples would be used to assess the temperature profile across the bed. Results are shown in Table 15.

TABLE 15

ANALYSIS OF IRP
Heritage Zinc Process, Run 9

| Sample | % Zn | % Cd | % Pb | % Fe | % C |
|---|---|---|---|---|---|
| IRP Top Fraction | 1.0 | <0.011 | <0.20 | 36 | 0.58 |
| IRP Middle Fraction | 0.36 | <0.011 | <0.20 | 37 | 6.2 |
| IRP Bottom Fraction | 0.13 | <0.011 | <0.20 | 40 | 4.4 |

Notes:
Samples were prepared for analyses by acid digestion (Modified SW-846 3050B).
Metals analyses completed by CLO ICP-AES.

It was assumed that accretions at the bottom and/or middle portions of the sagger where vent space was added still hampered removal of zinc from the sagger. This was somewhat confirmed when the kiln was opened following completion of the cooling segment. The drilled side vent holes had accretions around them, similar to what was seen in Run 8. It appeared to almost close up the vent space available.

Results from analytical testing showed that there was good removal from the lower portion of the sagger, with 0.13 wt % zinc remaining in the IRP. The middle portion of the sagger had 0.36 wt % remaining in the IRP. The top portion of the sagger had 1.0 wt % zinc remaining in the IRP. It was determined that the increased vent space directly above the sagger facilitated zinc oxide being deposited back onto the top of the material in the sagger. There was some loose, fluffy dropout material within the kiln, showing that oxidizing conditions existed in the kiln during the period material was volatilizing. Another item to note on the analysis was carbon that remained in the middle and lower portions of the sagger (6.2 wt % and 4.4 wt %, respectively).

Run 10

The purpose of Run 10 was to attempt to repeat Run 3 with coarse coke as the reductant instead of fine coke. Run parameters, i.e. the time it took to reach the predetermined temperature of 1218° C. (2225° F.), were to be studied. Results are shown in Tables 16 and 17.

TABLE 16

ANALYSIS OF IRP
Heritage Zinc Process, Run 10

| Sample | % Zn | % Cd | % Pb | % Fe | % C |
|---|---|---|---|---|---|
| IRP Composite | 0.28 | <0.011 | <0.20 | 34 | 4.1 |

Notes:
Samples were prepared for analyses by acid digestion (Modified SW846 3050B).
Metals analyses completed by HRG ICP-AES.
Carbon analyses completed by CLO total carbon analyzer.

TABLE 17

OUTSIDE ANALYSIS OF ZINC OXIDE
Heritage Zinc Process, Run 10

| Target Constituent | Baghouse Dust (Run 6–10), wt % | Furnace Dropout (Run 10), wt % |
|---|---|---|
| Zn | 67.5 | 80.5 |
| Fe | 0.02 | 0.004 |
| Pb | 1.16 | 0.006 |
| Cd | 0.05 | 0.013 |
| Cu | 0.006 | 0.001 |
| Na | 0.73 | 0.002 |
| K | 1.03 | 0.0014 |
| Mg | 0.002 | 0.0002 |
| Cl− | 4.72 | 0.02 |
| F− | 0.11 | 0.0007 |
| Al | 0.002 | 0.002 |
| Ni | 0.002 | 0.003 |
| Co | <0.0001 | <0.0001 |
| As | 0.005 | <0.0001 |
| Sn | 0.009 | 0.005 |
| Sb | 0.0004 | 0.0002 |

Analytical results for the products produced from the run looked very good. The IRP had very little zinc remaining (0.28 wt %), and cadmium and lead were below detection limits. The baghouse dust from Runs 6–10 was found to have 67.5 wt % zinc, which is 84.0 wt % zinc oxide. Chloride concentration was 4.72 wt %. The furnace dropout material from Run 10 was 80.5 wt % zinc, which is virtually 100% zinc oxide.

Run 11

The purpose of this run was to test the large high alumina sagger with additional vent space beyond what was previously attempted in Run 9. Use of the larger sagger will assess the ability to obtain good zinc removal with deeper bed depths. An assessment of adequate vent space was required for planning the full scale design. Vent space would be increased by drilling several more holes in the sagger, this time on the bottom. The spacing of the cover saggers was widened, to further increase vent space. Thermocouples were used to assess temperature profile through the vertical sections through the bed depth.

At the time this run was planned and completed, the analyses had not been completed on the IRP from Run 9. It was found from the analysis that having somewhat of an open vent space may have facilitated removal of zinc, but may have been redeposited back onto the IRP. The upper portion of IRP in Run 9 had 1.0 wt % zinc, while the lower portion of the IRP had 0.13 wt % zinc. The increased vent space provided by placing small saggers over the large sagger gave the zinc oxide more opportunity to redeposit back onto the IRP. The analytical data for the Run 11's IRP shown in Table 18 indicated redeposition occurred at a greater rate than in Run 9, because of the increased opportunity to do so. The concentration of zinc in the upper portion of the IRP was 3.33 wt %, and iron at a concentration of 36.06 wt %.

TABLE 18

ANALYSIS OF IRP
Heritage Zinc Process, Run 11

| Sample | % Zn | % Cd | % Pb | % Fe | % C |
|---|---|---|---|---|---|
| Composite of Run 11 IRP | 3.33 | <0.011 | <0.20 | 36 | 1.8 |

Notes:
Samples were prepared for analyses by acid digestion (Modified SW-846 3050B).
Metals analyses completed by HRG ICP-AES.
Carbon analyses completed by CLO total carbon analyzer.

Though not verified, it was conjectured that the test was run under oxidizing conditions in the kiln. This may not have truly been the case. Accretions were again formed at vent spaces on the lower half of the sagger. It is believed that if an adequate zinc removal rate was achieved, i.e. removal of volatilized material from the sagger was unimpeded, there may not have been very much, if any, dropout material within the kiln.

This is because the velocity of the metallurgical fumes was so low that adequate time was available to oxidize the zinc. It may not have had time to oxidize if the metallurgical fumes were exiting the sagger unimpeded.

Run 12

The purpose of Run 12 was to complete a test run up to the 900° C. (1650° F.) level to determine if chlorides and other target elements are removed at this point, or to what extent they have been removed. New high temperature cartridges were installed in the baghouse, so that material captured only during this run would be analyzed, along with the starting briquettes and ending IRP. The analytical data is shown in Table 19.

TABLE 19

ANALYSIS OF FEED MATERIAL AND IRP
Heritage Zinc Process, Run 12

| Sample | % Zn | % Cd | % Pb | % Fe | % C |
|---|---|---|---|---|---|
| Start Briquettes | 19 | 0.008 | 0.22 | 18 | 9.9 |
| Composite of Run 12 IRP | 20 | <0.011 | <0.20 | 20 | 1.3 |

Notes:
Samples were prepared for analyses by acid digestion (Modified SW-846 3050B).
Metals analyses completed by HRG ICP-AES.
Carbon analyses completed by CLO total carbon analyzer Analytical results from the starting material indicated the zinc level was 18.76 wt %. The ending material had a zinc level of 20.09 wt %. This slight increase in zinc concentration was caused by the loss of coke and water.

The attempt to collect material that typically volatilized before reaching the 900° C. (1650° F.) level was not successful. When the test was terminated, the monitored sagger's temperature began to drop right away, implying the coke, i.e. the fuel source, had been expended.

Run 13

Run 13 was performed to process material from a previously aborted test run. Eight small high alumina saggers with briquettes were available to process. The goal was to remove the zinc from the material, and produce zinc oxide for continued testing and evaluation by other parties. The material processed without any notable problems or events. Oxidizing conditions within the kiln were apparent, as dropout material was found in the kiln following the run.

Run 14

Run 14 was performed to repeat Run 3 with fine coke as the reductant, to see if the results could be duplicated. A portable oxygen monitor was installed to confirm reducing conditions existed in the kiln. The test run was also accelerated as much as possible, to see if a shorter cycle time could achieve good zinc removal from the briquettes.

Figure 11:
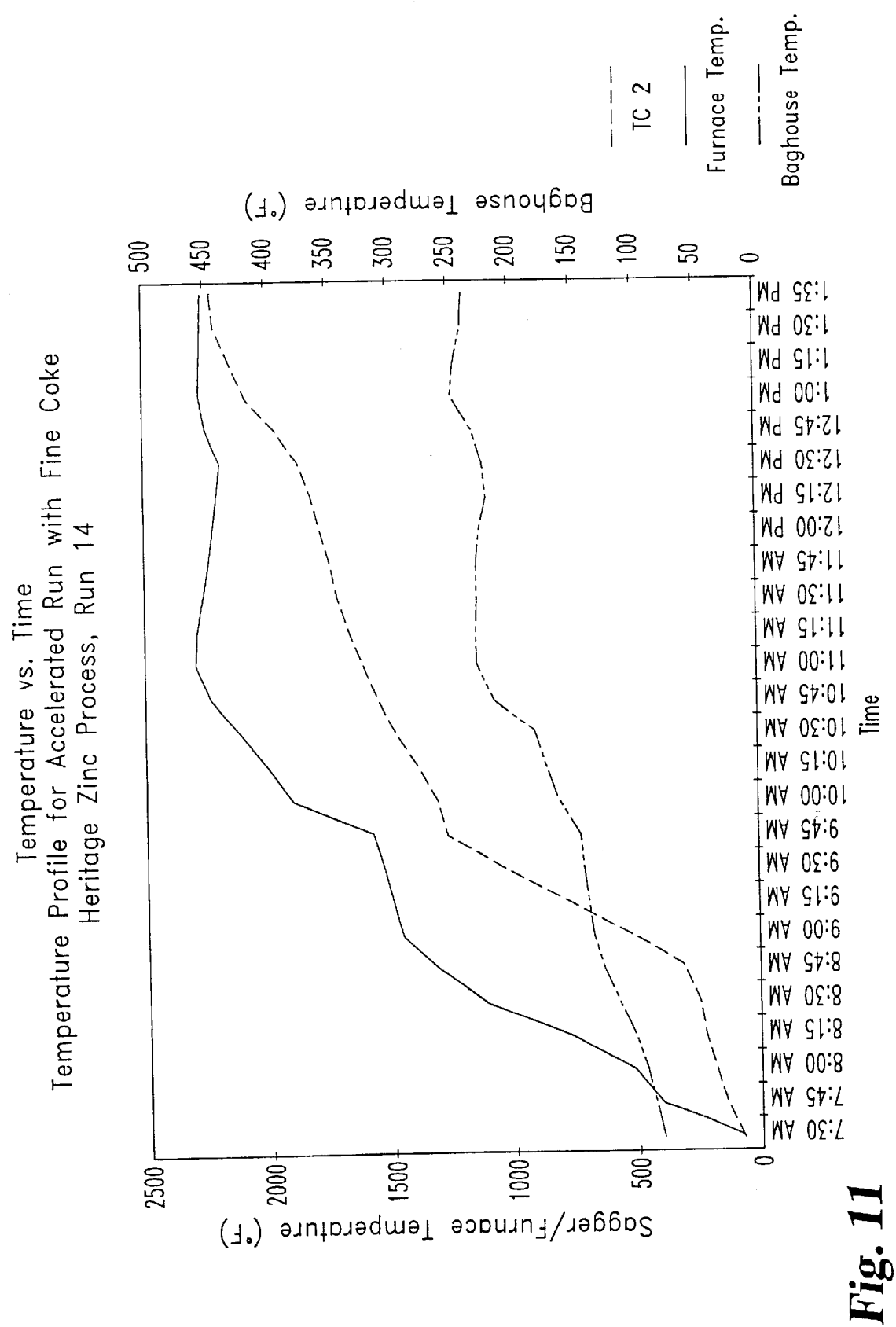
FIG. 11 is a chart showing the temperature profile for Run 14.

The test run was conducted at an accelerated rate as shown by the temperature profile in FIG. 11, so it was expected that the saggers would have problems with thermal shock. This was confirmed at the end of the run as they were severely cracked, some completely in half.

This run served to highlight the impact of too rapid of a temperature increase in the kiln during operation. Although the run was not out of control, excess oxygen in the kiln accelerated the rate of temperature rise in the saggers. It was not intended to have the temperature in the monitored sagger rise as fast as it did; in a full-scale system, this would result in thermal shock to the saggers. Through the middle of the run, gas flow adjustments were able to slow the rise.

TABLE 20

ANALYSIS OF FURNACE DROPOUT MATERIAL
Heritage Zinc Process, Run 14

| Sample | % Zn | % Cd | % Pb | % Cl | % Fl |
|---|---|---|---|---|---|
| Furnace Dropout | 82 | <0.0062 | <0.10 | 0.29 | <0.12 |

Notes:
Samples were prepared for analyses by acid digestion (Modified SW-846 3050B).
Metals analyses completed by HRG ICP-AES.
Carbon analyses completed by CLO total carbon analyzer.

Analysis results are shown in Table 20. The analysis of the dropout material indicated the very high level of zinc in the zinc oxide (82.04%), making this 102.1% ZnO. It is possible that the material included a small amount of metallic zinc, or the analysis was slightly high. It was postulated that volatilized zinc metal may have coated zinc particles that had already oxidized.

Run 15A

Run 15A was planned to be a two step run: Run 15A would be completed to 900° C. (1650° F.), to ascertain whether or not chlorides could be completely removed at this temperature level. Run 15B would complete this run up to the 982° C. (1800° F.) level, beyond where chlorides should have been removed. The 900° C. (1650° F.) level had been determined early in project planning, and was postulated as being the point where a cut could be made, i.e. fractional distillation. The mix for the briquettes would be changed to a 50:50 fine coke to coarse coke mixture. Results from Run 15A are shown in Table 21.

TABLE 21

ANALYSIS OF SAMPLES TO DETERMINE FEASIBILITY OF CUT POINT
Heritage Zinc Process, Run 15A

| Sample | % Zn | % Cd | % Pb | % Fe | % C | % Cl⁻ | % F⁻ |
|---|---|---|---|---|---|---|---|
| 1417-1463 F | 84 | 0.028 | 0.21 | N/A | N/A | 1.8 | <0.12 |
| 1497-1527 F | 85 | 0.019 | 0.17 | N/A | N/A | 1.5 | <0.12 |
| 1543-1571 F | 83 | 0.011 | 0.16 | N/A | N/A | 1.2 | <0.12 |
| 1580-1600 F | 90 | 0.0080 | 0.21 | N/A | N/A | 1.2 | <0.12 |
| 1603-1620 F | 87 | <0.0062 | 0.19 | N/A | N/A | 1.4 | <0.12 |
| 1622-1635 F | 83 | <0.0062 | 0.18 | N/A | N/A | 1.2 | <0.12 |
| 1635-1650 F | 81 | <0.0062 | 0.17 | N/A | N/A | 1.1 | <0.12 |
| Baghouse Dust | 79 | 0.043 | 1.2 | N/A | N/A | 5.6 | <0.12 |
| Start Briquettes | 19 | <0.011 | 0.21 | 16 | 10 | N/A | N/A |
| IRP | 20 | <0.011 | <0.20 | 22 | 1.6 | N/A | N/A |

Notes:
Samples were prepared for analyses by acid digestion (Modified SW-846 3050B).
Metals analyses completed by HRG ICP-AES.
Carbon analyses completed by CLO total carbon analyzer.
Inorganic anions analyses completed by CLO ion chromatography.

Analytical results from samples collected during and following the run indicated that all the chlorides were not being removed before 900° C. (1650° F.). It was initially concluded that the test was unsuccessful because chlorides were still present in the partially processed briquettes removed from the monitored sagger. By examination of what happened during the next phase of the test, i.e. Run 15B, the saggers may not have had adequate time to finish the desired reactions before reaching the target temperature for Run 15A.

It was evident from the duct grab samples collected that cadmium was removed fairly early and reported to the baghouse. Lead was detected through all samples, however it was known that a specific structure of lead chloride may be present in the EAF dust, which volatilizes at 950° C. (1742° F.). The concentrations reported for zinc appeared to be very high throughout all the grab samples tested. Concentrations of 81.36 wt % Zn to 89.65 wt % Zn were found. Pure zinc oxide is 80.34 wt % Zn.

Run 15B

Run 15B was performed to complete the two-phased run, continuing operation with reducing conditions existing in the kiln to prevent material from dropping out before exiting. Evaluation of data collected showed material that volatilizes below 900° C. (1650° F.) was still present, and the amount remaining in the briquettes still was of an amount to be detected visually, observing metallurgical fumes exiting the kiln and by inspection of the temperature data. Because the reactions had not been fully completed to the target level of 900° C. (1650° F.) in Run 15A, it cannot be determined that a cut point could not be attained.

Run 16

Figure 12:
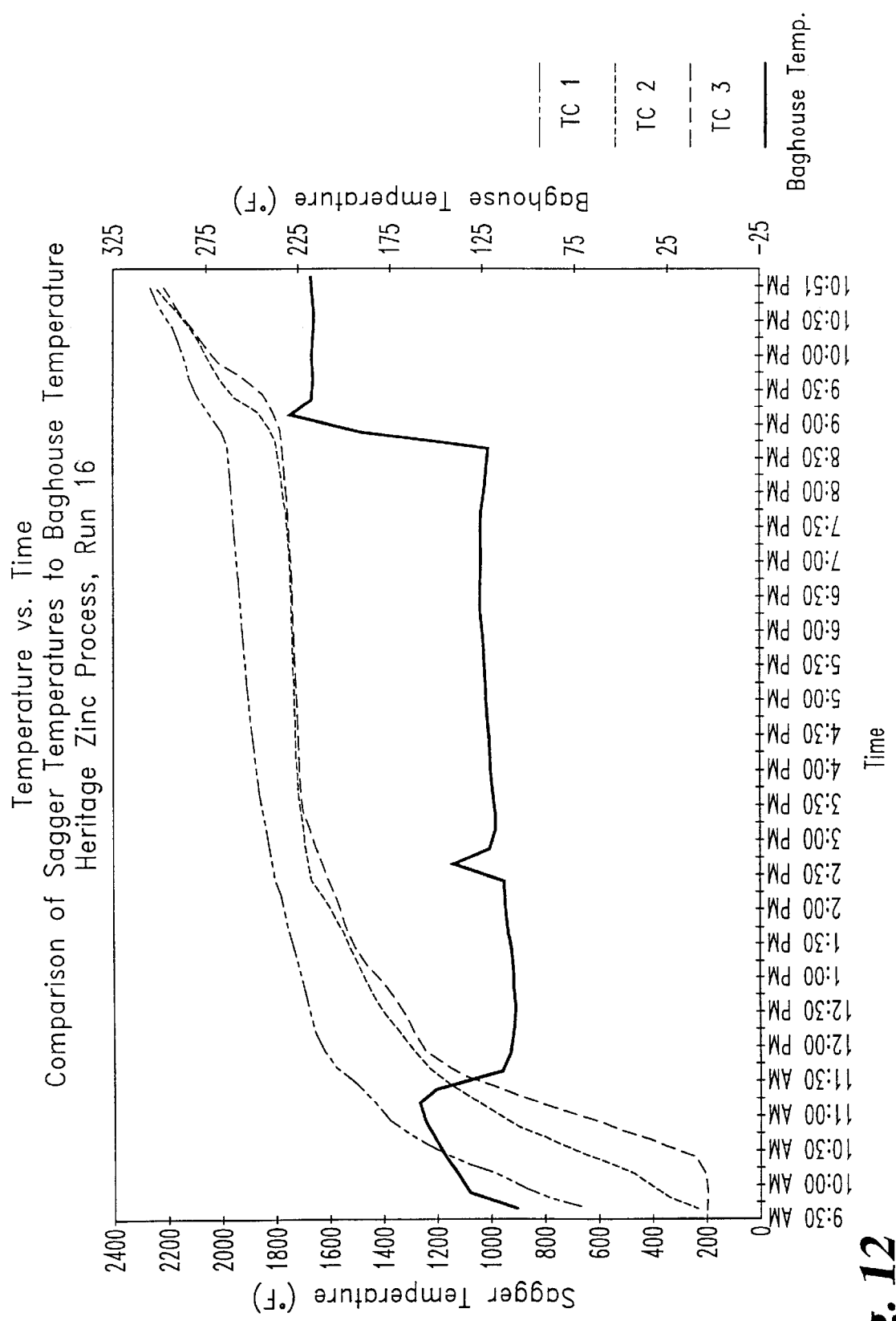
FIG. 12 is a chart showing the temperature profile for Run 16.
Figure 13:
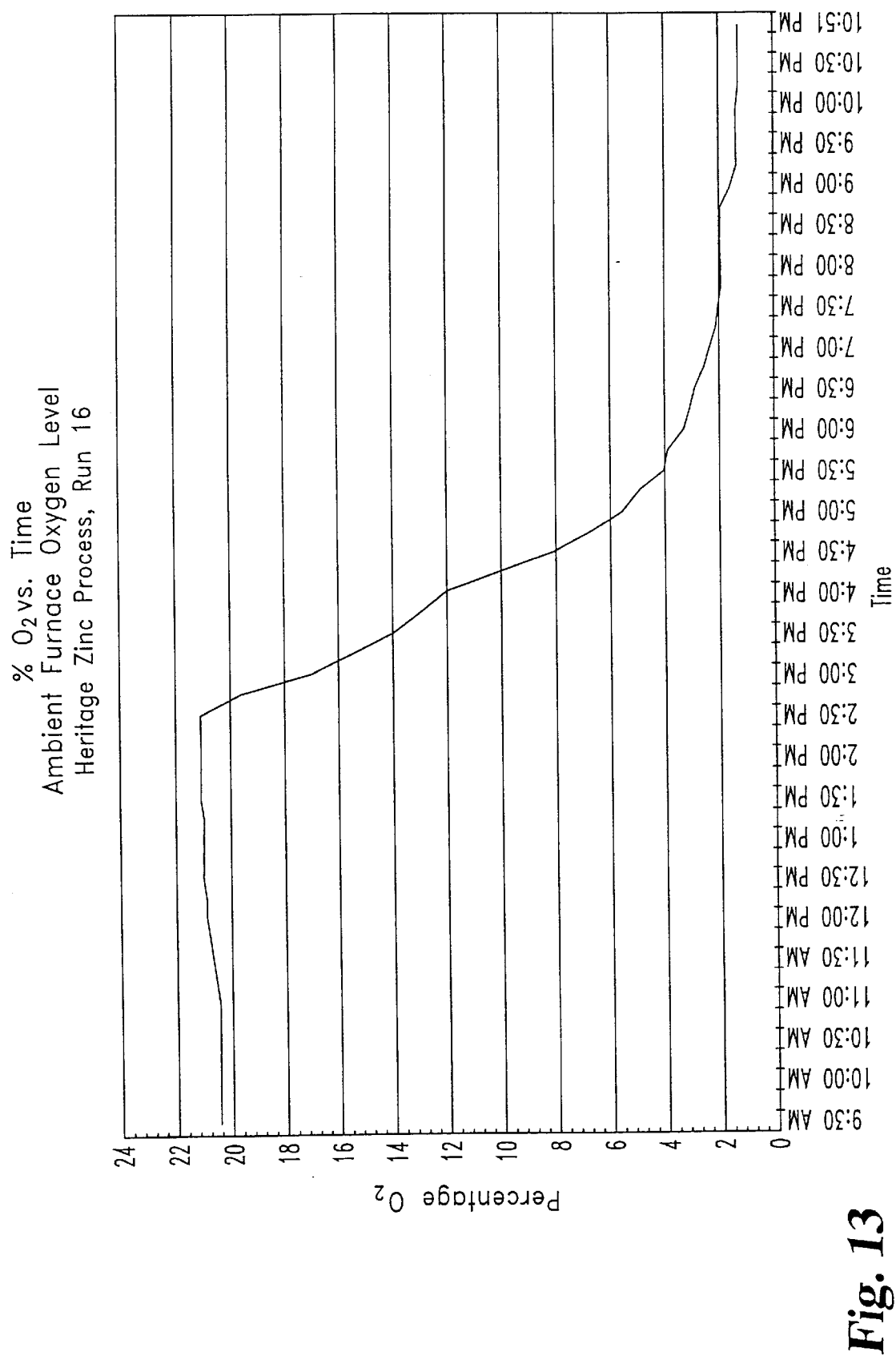
FIG. 13 is a chart showing ambient furnace oxygen levels for Run 16.

The purpose of this run was to test the possibility of running with a deeper bed depth, utilizing the smaller saggers available. The run was to be conducted with a reducing atmosphere within the kiln, to prevent reoxidized zinc from dropping out. FIGS. 12 and 13 show the temperature and oxygen level profiles. Table 22 shows the results of the analysis.

TABLE 22

ANALYSES OF MATERIAL FROM 9" BED DEPTH RUN
Heritage Zinc Process, Run 16

| | Sample | | | |
|---|---|---|---|---|
| | % Zn | % Fe | % Pb | % C |
| Start Briquettes | 20 | 16 | 0.25 | 10 |
| Composite of Run 16 IRP | 0.10 | 42 | <0.12 | 2.6 |

Notes:
Samples were prepared for analyses by acid digestion (Modified SW-846 3050B).
Metals analyses completed by HRG ICP-AES.
Carbon analyses completed by CLO total carbon analyzer.

Results from the analyses confirmed that recovery of zinc from the start material under reducing conditions was acceptable. The starting concentration was 20.27 wt % Zn, and final concentration in the IRP being 0.1 wt % Zn. The processing time of just over 14 hours was longer than anticipated. The vent space available for metallurgical fumes to exit was the same as for tests usually run with the small high alumina saggers. The location of the vent spaces may have played a role in the relatively slow temperature increase. Material volatilizing throughout the two saggers had to compete to make it out of generally one centralized location, which was in the center of the configuration.

Run 17

The purpose of Run 17 was to process saggers full of loose baghouse dust, to determine if chlorides, cadmium and lead could be removed. The run was planned to be taken to 982° C. (1800° F.), where it was assumed that these constituents would be removed from the baghouse dust. Results are shown in Table 23.

TABLE 23

ANALYSES OF PROCESSED BAGHOUSE DUST
Heritage Zinc Process, Run 17

| | Sample | | | |
|---|---|---|---|---|
| | % Zn | % Cd | % Pb | % Cl⁻ | % F⁻ |
| Preprocessed Baghouse Dust | 70 | 0.055 | 1.5 | 4.4 | <0.080 |
| Large Open Sagger Dust | 83 | 0.037 | 0.28 | 2.2 | <0.080 |
| High Alumina Sagger Dust | 74 | 0.046 | 1.2 | 3.7 | <0.080 |
| Cordierite Sagger Dust | 80 | 0.013 | 0.69 | 2.3 | <0.080 |

Notes:
Samples were prepared for analyses by acid digestion (Modified SW-846 3050B).
Metals analyses completed by HRG ICP-AES.

The color change associated with the processed baghouse dust has been noted in chemical reference literature when zinc oxide is subjected to subsequent heat cycles. There was some reduction of unwanted constituents in the various configurations. Vapor pressures for the target constituents may not have been high enough to completely volatilize away from the kiln. It was concluded that a higher temperature would be needed to facilitate removal of the unwanted constituents.

Run 18

The purpose of this run was to test several different types of saggers. Several were various mixes of alumina and cordierite saggers. Additionally, one of the high alumina saggers that had been in use throughout the project would be used with the current EAF dust blend. This is because the dust properties can change over time, and the possibility of these properties possibly being a cause of the sagger fusing problem needed to be excluded when evaluating saggers for use.

Material processed in almost all saggers fused to the saggers. The only exception was the high alumina sagger that was used throughout most of the project. From that observation, it was concluded that the EAF dust had not changed characteristics enough to affect IRP release from the high alumina sagger.

Run 19

The purpose of this run was to see if an acceptable level of zinc removal could be attained in the IRP by only going up to 1149° C. (2100° F.). Several commercially available release layers were also tested in the saggers processed during the run. A sagger of baghouse dust was also included to determine if better contaminant removal could be accomplished by being processed to the target temperature for the run.

The results in Table 24 show that the treated baghouse dust was brought to a sufficiently high temperature at which unwanted constituents, i.e. cadmium, lead and chloride, were removed to a very low level.

TABLE 24

ANALYSES OF RUN TO 2100° F.
Heritage Zinc Process, Run 19

|  | Sample | | | | |
| --- | --- | --- | --- | --- | --- |
|  | % Zn | % Cd | % Pb | % Cl$^-$ | % F$^-$ |
| Preprocessed Baghouse Dust | 74 | 0.053 | 1.0 | 5.9 | 0.12 |
| Processed Baghouse Dust | 83 | 0.010 | <0.11 | 0.22 | 0.012 |
| Composite of Run 19 IRP | 9.9 | <0.0064 | <0.11 | N/A | N/A |

Notes:
Samples were prepared for analyses by acid digestion (Modified SW-846 3050B).
Metals analyses completed by HRG ICP-AES.
Inorganic anions analyses completed by CLO ion chromatography.

The test to see if zinc could be removed to a low level in the IRP was not as successful. A significant amount of zinc was left in the IRP. It appeared that complete processing of the IRP could not be attained until reaching the level of about 1218° C. (2225° F.).

Run 20

The purpose of this run was to establish a material balance for the operation of the furnace, specifically between the dropout material and the baghouse dust. The test would also look at the feasibility of a seven inch bed depth, and examine the temperature differences between sections of a single sagger when using a larger size.

Analytical results of the IRP showed that zinc was not completely removed after the run. Examination of the Ellingham Diagram, shown in FIG. 5, illustrates why a reaction did not occur. The diagram, which is used for pyrometallurgical operations, shows that by changing the partial pressures of CO, $CO_2$, and $O_2$, the reaction lines will shift. By increasing the $CO/CO_2$ ratio, the $2CO+O_2 \rightarrow 2CO_2$ reaction line is lowered, and the reactions would have occurred. It was determined that is was desireable to achieve a partial pressure of carbon monoxide to carbon dioxide sufficient to reduce the metal oxides to the corresponding metal. For example, a $CO/CO_2$ ratio of at least 50 to 1 was required for reduction to begin at 900° C.; or 15:1 at 1000° C.; or 5:1 at 1100° C., on the compounds present in the briquettes. It was not possible to achieve that ratio with the excess headspace available in the partially filled sagger. Therefore, the run was a valuable reminder to maintain proper operating conditions for the desired results inside the saggers.

Run 21

Run 21 was performed to establish a profile of metals or metal compounds being volatilized and reoxidized once outside of the kiln, while the kiln interior was being maintained in a reducing condition. The test saggers additionally would each have a different release layer, continuing the testing on various release layers suggested by the research group. A series of grab samples from the duct were also planned so as to provide addition insight where constituents were being released.

A toxic characteristic leaching procedure (TCLP) in accordance with EPA method SW846-1310 was performed. Results of the TCLP analyses found that the IRP was determined to be nonleachable for the characteristic metals targeted by the procedure. Lab results indicated zinc went from 23 wt % Zn in the start briquette to 1.2 wt % Zn in the IRP. The baghouse dust from Run 21 has 69 wt % Zn. The lab's ICP and HPLC analytical results are listed on Table 25.

TABLE 25

ANALYSIS OF PRODUCTS PRODUCED
Heritage Zinc Process, Run 21

| Target Constituent | Start Briquettes (wt %) | IRP (wt %) | Baghouse Dust (wt %) |
| --- | --- | --- | --- |
| Zn | 23 | 1.2 | 69 |
| Cu | 0.073 | 0.18 | 0.0042 |
| Co | 0.0019 | 0.0037 | <0.0010 |
| Cd | 0.0075 | 0.00023 | 0.031 |
| Pb | 0.31 | <0.00098 | 1.1 |
| Fe | 24 | 45 | 0.062 |
| Mn | 1.4 | 3.1 | <0.0010 |
| Cr | 0.12 | 0.11 | <0.0010 |
| Ti | 0.018 | 0.029 | <0.0010 |
| Ca | 3.3 | 6.9 | 0.015 |
| K | 0.42 | 0.046 | 0.64 |
| Al | 0.16 | 0.26 | 0.0082 |
| Mg | 2.4 | 4.4 | <0.0010 |
| Br$^-$ | N/A | N/A | 0.017 |
| Cl$^-$ | N/A | N/A | 4.49 |
| F$^-$ | N/A | N/A | <0.025 |
| $NO_3^-$ | N/A | N/A | <0.013 |
| $NO_2$ | N/A | N/A | <0.013 |

Notes:
All units are mg/kg
Metals analyses completed by CLO ICP-AES.

The test appeared to meet the objectives set for the test run. The run was operated with a reducing atmosphere in the kiln interior. Once analyses of the grab samples is completed, a more complete delineation will be possible of when metals of interest are being removed from the IRP.

Run 22

The purposes of Run 22 were to (1) establish a material balance for the process under oxidizing conditions; (2) identify a profile of metals or metal compounds being volatilized and reoxidized once outside of the sagger; and (3) investigate new release layers and confirm past results. Ultimately, this run established the planned design conditions for the full-scale process.

Run material was prepared using material from Drum #5 of the Nucor Steel EAF dust. A mixture of 100 parts EAF dust, 15 parts 50:50 fine/coarse coke, and a small amount of water was added. Six cordierite saggers were used for the test. The six saggers were loaded with briquettes produced from the prepared EAF/coke mixture and placed in the kiln. The depth of material in each sagger was approximately 15.2 cm (6.0 in). Two oxygen monitors were used to track levels in the sagger and kiln interior. Three thermo couples (TC1, TC2, TC3) were placed inside the saggers to monitor the temperature inside containers.

The kiln had been cleaned and brushed down with a soft brush to remove the dropout material that remained in the furnace from previous testing. Additionally, the cartridges in the baghouse were removed and weighed, so that the amount of dust collected could be determined following the run.

Figure 14:
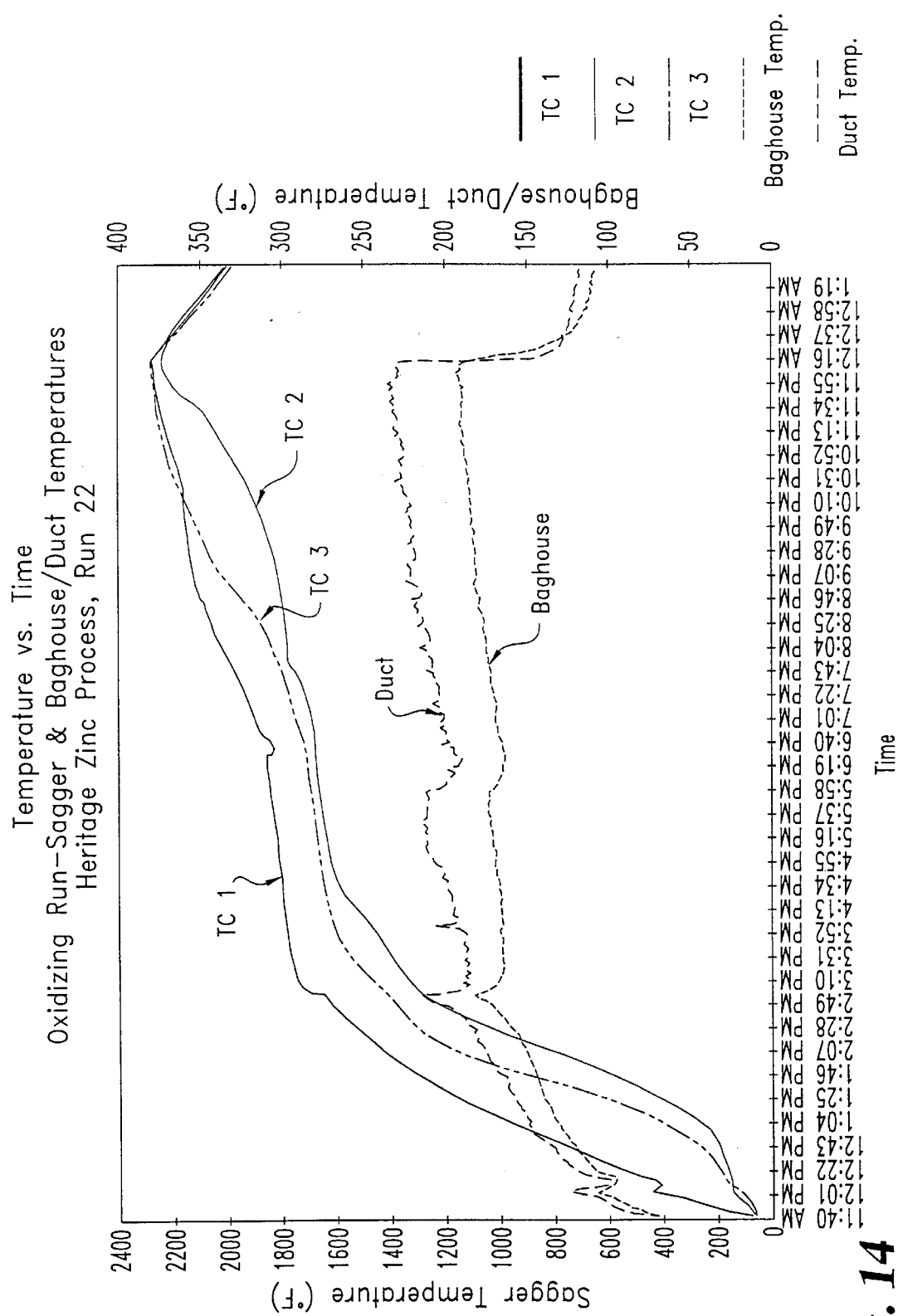
FIG. 14 is a chart showing the termperature profile for Run 22.
Figure 15:
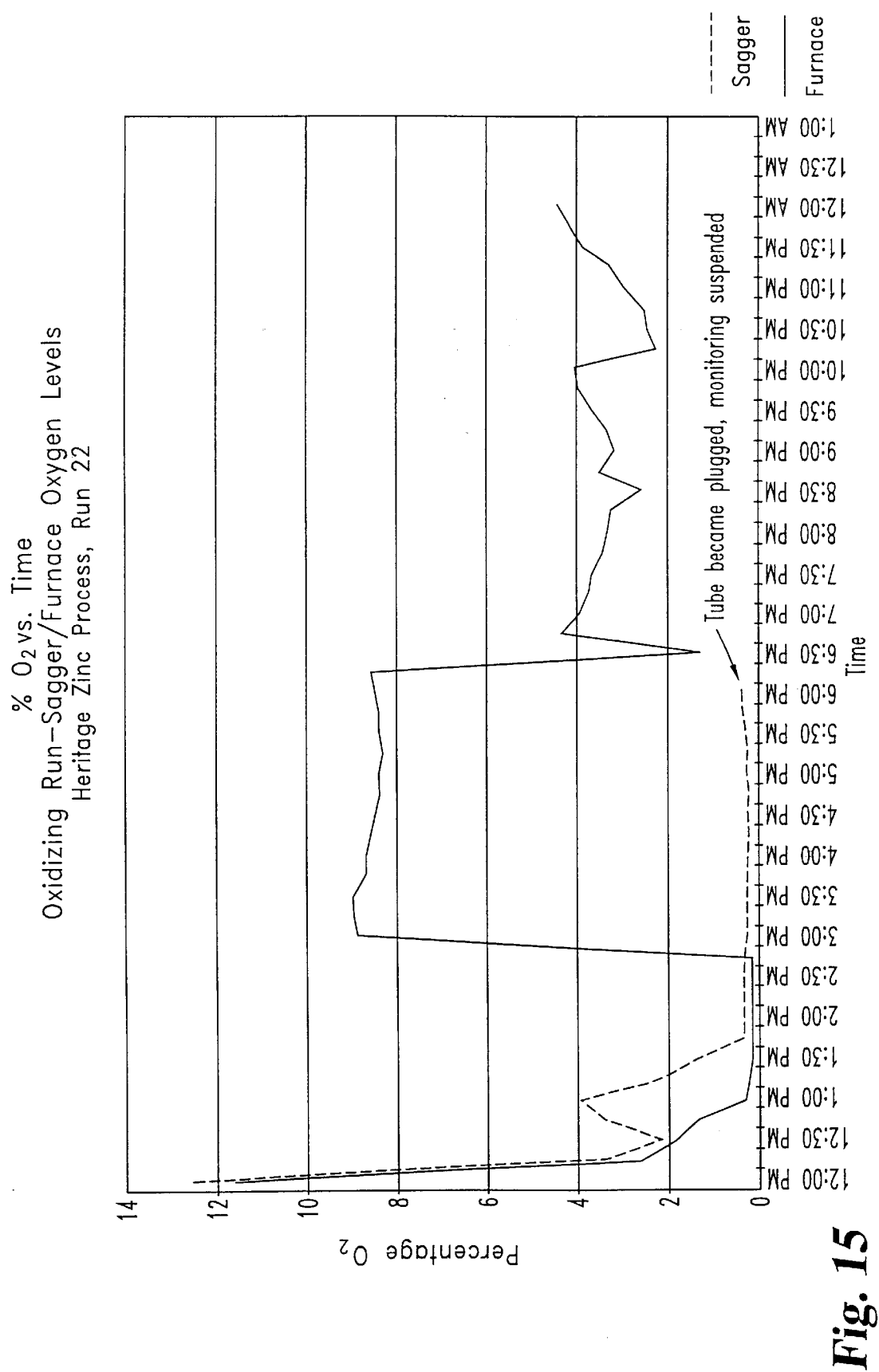
FIG. 15 is a chart showing oxygen levels in Run 22.

The temperature profile and oxygen levels for the heating cycle are illustrated graphically in FIGS. 14 and 15, respectively. It can be seen that it took approximately 1.25 hours for the drying step to be completed (in TC2). Once the drying stage had passed, the temperature rise initially averaged 334° C./hr (600° F./hr) for the first several hours. The rate of increase varied for several hours while the furnace heat and oxygen levels were being stabilized.

The combustion air input into the furnace was set close to fully open. The gas input into the furnace was approximately 2.5 times the amount that Run 21 started with. It was learned from previous runs that accelerating the process with adequate combustion air, and therefore heat, seemed necessary to steer the process to reducing or oxidizing operating conditions. At the beginning of the run, the temperature accelerated quickly, however oxygen levels dropped quickly in both the kiln interior and inside the monitored sagger as shown in FIG. 15. A small jump can be seen in the oxygen level inside the sagger that starts in the first hour of operation. This may be the result of decomposition of certain compounds possibly in the EAF dust.

Once the material in the saggers was at a low oxygen level, the furnace oxygen level could be increased. The gas flow to the burners was reduced by almost half, and the oxygen levels increased in the kiln to a desirable level. The rate of temperature rise initially increased rapidly in the saggers. This can be seen in FIG. 14, particularly with TC1. It was also noted the temperature rise in duct and baghouse were associated with this increase, and not a release of material.

Metal fumes began to exit the furnace 250 minutes after the run was started; at this point, the sagger $O_2$ level was 0.2% and the kiln interior $O2$ level was 8.7%. The temperatures of the saggers were as follows: TC1 was 972.9° C. (1783.2° F.); TC2 was 800.2° C. (1472.4° F.); TC3 was 874.9° C. (1606.9° F.). The ambient furnace temperature was 976.2° C. (1789.2° F.). The furnace oxygen was not affected much, since chlorides were being evolved and utilized (based on experience from previous runs). Grab sample collection from the duct between the kiln and baghouse was begun. The saggers were at times 83° C. (150° F.) apart from each other. Therefore, when a grab sample was obtained, a particular range it came from was recorded. Samples were archived for later analyses.

Several hours later, the gas was turned up. The effect of this can be seen in FIG. 14, where TC1 dropped temporarily, although the overall rate of temperature increase jumped slightly for all saggers shortly after. It can also be seen in FIG. 15, where the kiln interior oxygen level dropped. The gas flow was adjusted to bring the kiln interior to 4% oxygen, and the level was quickly stabilized to 4.3% $O_2$.

Once zinc metal began to volatilize, the rate of temperature rise had stabilized to approximately 17° C./hr (30° F./hr). This rate increased once zinc had been volatilized, to approximately 56° C./hr (100° F./hr).

From this point of the run, gas flow was reduced, and oxygen levels rose several times for the next several hours. As oxygen was consumed in the kiln interior, the concentration could be bumped up by only controlling gas flow, and having the combustion air steady at an acceptable level. By trying to control the oxygen levels with combustion air only, the temperature increase proved to be too great for the baghouse.

Once it was apparent that volatilized zinc metal had been removed from the material, and the consumption of oxygen from the kiln interior had subsided, oxygen levels started to jump significantly, even though the gas flow had to be increased at this point in order to keep the temperature in the system increasing. When the last compounds/metals were coming off, the rate of temperature increase slowed to approximately 39° C./hr (70° F./hr). The temperatures in the saggers at this point were as follows: TC1 was 1183.0° C. (2161.4° F.); TC2 was 1042.9° C. (1909.3° F.); TC3 was 1183.9° C. (2163.1° F.). The ambient furnace temperature was 1218.4° C. (2225.2° F.).

When the run was terminated, the temperatures in the saggers were as follows: TC1 was 1247.3° C. (2277.2° F.); TC2 was 1227.4° C. (2241.4° F.); TC3 was 1245.9° C. (2274.6° F.). The total time of the heating cycle was 12.25 hours.

The next day, when the kiln had sufficiently cooled, the kiln and the saggers were inspected. There was significant dropout of high purity zinc material in the kiln. Dropout high purity zinc material was collected from the furnace and weighed. Total dropout material collected was 11.23 kg (24.8 lbs). The total weight increase to the baghouse cartridges was 8.2 kg (18 lbs).

A composite sample of IRP from one of the monitored saggers was collected and submitted for analyses by SW-846 1311, Toxicity Characteristic Leaching Procedure (TCLP). A split from the sample was submitted to Heritage's commercial lab for analyses by SW-846 6010B, Inductively Coupled Plasma-Atomic Emission Spectrometry and SW-846 9056, Determination of Inorganic Ions by Ion Chromatography. The results for the TCLP are shown in Table 26. Results of the ICP-AES and HPLC analytical work is shown in Table 27.

TABLE 26

TCLP RESULTS FOR IRP
Heritage Zinc Process, Run 21

| | Sample pulled | | | | | | |
| --- | --- | --- | --- | --- | --- | --- | --- |
| | As | Ba | Cd | Cr | Pb | Ag | Hg |
| Run 21 ERP | <0.025 | 0.18 | <0.005 | <0.05 | <0.025 | <0.05 | <0.0020 |
| Regulatory Level in TCLP Extract (40 CFR Part 261.24) | 5 | 100 | 1 | 5 | 5 | 5 | 0.2 |

Notes:
All units are mg/L.

TABLE 27

ANALYSIS OF PRODUCTS PRODUCED
Heritage Zinc Process, Run 22

| Target Constituent | Start Briquettes (wt %) | IRP (wt %) | Dropout Material (wt %) | Baghouse Dust (wt %) |
|---|---|---|---|---|
| Zn | 25 | 0.14 | 75 * | 70 ** |
| Cu | 0.075 | 0.18 | 0.0021 | 0.0052 |
| Co | 0.0017 | 0.0042 | <0.00096 | <0.00097 |
| Cd | 0.0077 | 0.00024 | 0.000077 | 0.016 |
| Pb | 0.26 | <0.0010 | 0.0029 | 0.49 |
| Fe | 24 | 50 | 0.054 | 0.013 |
| Mn | 1.4 | 3.1 | 0.004 | <0.00097 |
| Cr | 0.1 | 0.14 | <0.00096 | <0.00097 |
| Ti | 0.016 | 0.024 | <0.00096 | <0.00097 |
| Ca | 3.6 | 7.9 | 0.014 | 0.018 |
| K | 0.48 | 0.050 | <0.00096 | 0.49 |
| Al | 0.11 | 0.36 | 0.011 | 0.0078 |
| Mg | 2.7 | 5.8 | <0.00096 | <0.00097 |
| $Br^-$ | N/A | N/A | <0.013 | 0.017 |
| $Cl^-$ | N/A | N/A | <0.062 | 4.23 |
| $F^-$ | N/A | N/A | <0.025 | <0.025 |
| $NO_3^-$ | N/A | N/A | <0.013 | <0.013 |
| $NO_2$ | N/A | N/A | <0.013 | <0.013 |

Notes:
All units are mg/kg
Metals analyses completed by CLO ICP-AES.
* Actual analysis of Zn is approximately 80%, due to matrix and method used.
** Actual analysis of Zn is approximately 75%, due to matrix and method used.

Results of the TCLP analyses showed that the IRP was determined to be nonleachable for the characteristic metals targeted by the procedure, as shown in Table 26. Results indicated that zinc went from 25 wt % Zn in the start briquette to 0.14 wt % Zn in the IRP. The baghouse dust from Run 21 had 70 wt % Zn. The furnace dropout material had 80 wt % Zn. The lab's ICP and IC analytical results are listed on Table 27.

The test appeared to meet the objectives set for the test run. The run was maintained with an oxidizing atmosphere within the kiln interior.

Run 23

Figure 16:
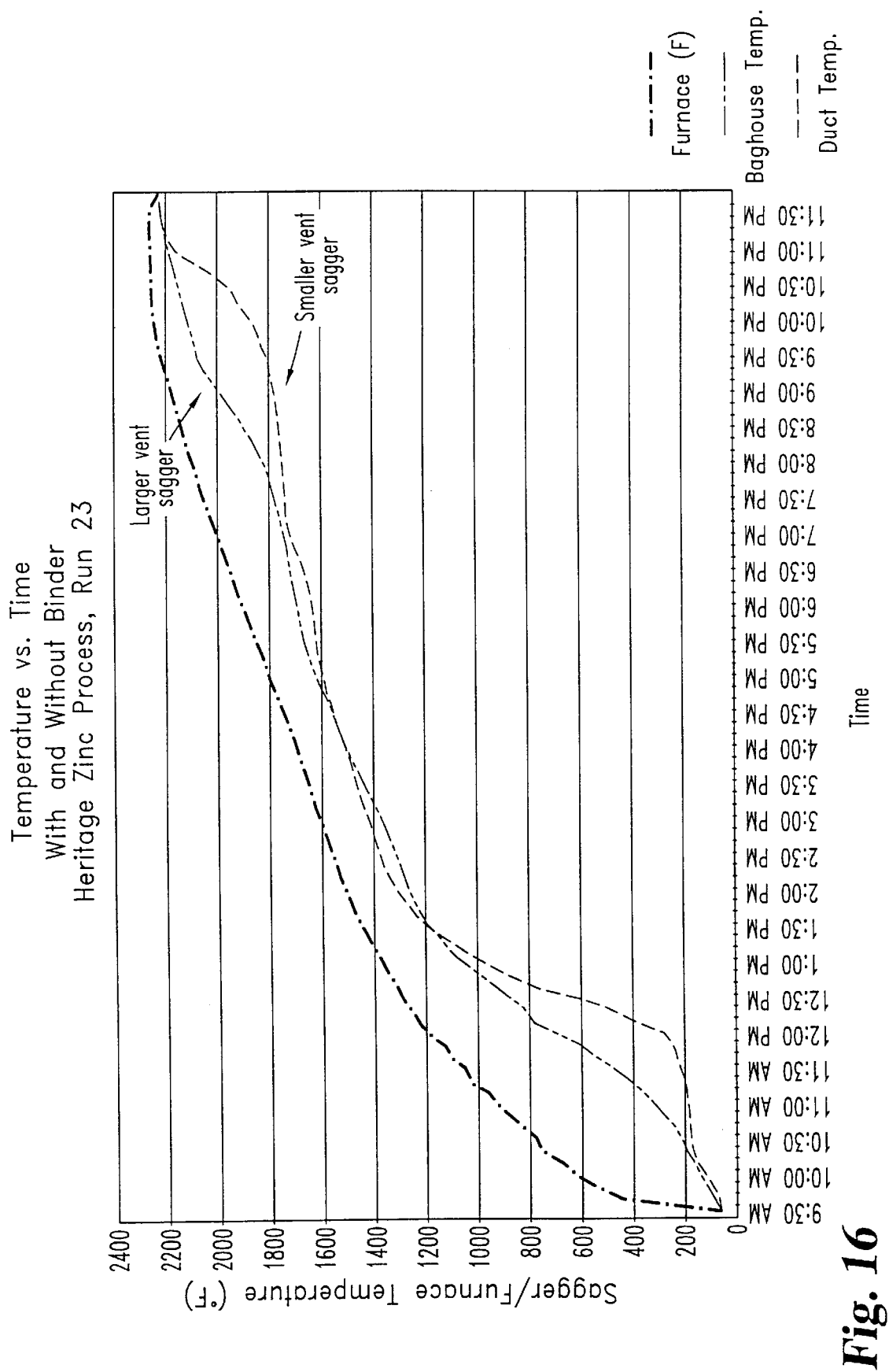
FIG. 16 is a chart showing the temperature profile for Run 23.

The purpose of Run 23 was to evaluate sagger materials, vent ratios and the use of organic binders for briquettes. The temperature profile for this Run is shown in FIG. 16 and the analysis results are shown in Table 28. It was determined that the zinc removal was much lower for saggers with higher vent to volume ratios.

Organic binders allowed briquettes to be made without much better initial strength which improved their handling characteristics. These binders did not have any impact on the process performance.

TABLE 28

ANALYSIS OF PRODUCTS PRODUCED
Heritage Zinc Process, Run 23

| Target Constituent | Large Vent IRP (%) (Sagger 97-04) | Small Vent IRP (%) (Sagger 00-08) |
|---|---|---|
| Al | 0.24 | 0.99 |
| K | 0.19 | 0.12 |
| Ca | 5.7 | 9.0 |
| Mn | 3.4 | 3.6 |
| Fe | 51.0 | 54.0 |
| Zn | 5.9 | 0.67 |
| Pb | 0.030 | 0.003 |
| Cd | 0.00035 | 0.00034 |
| Cu | 0.19 | 0.19 |
| Co | 0.0019 | 0.0018 |
| Mg | 3.6 | 3.6 |
| Ti | 0.045 | 0.047 |
| P | 0.00058 | BDL |

Notes:
Metals analyses completed by CLO ICP-AES

Run 24

Figure 17:
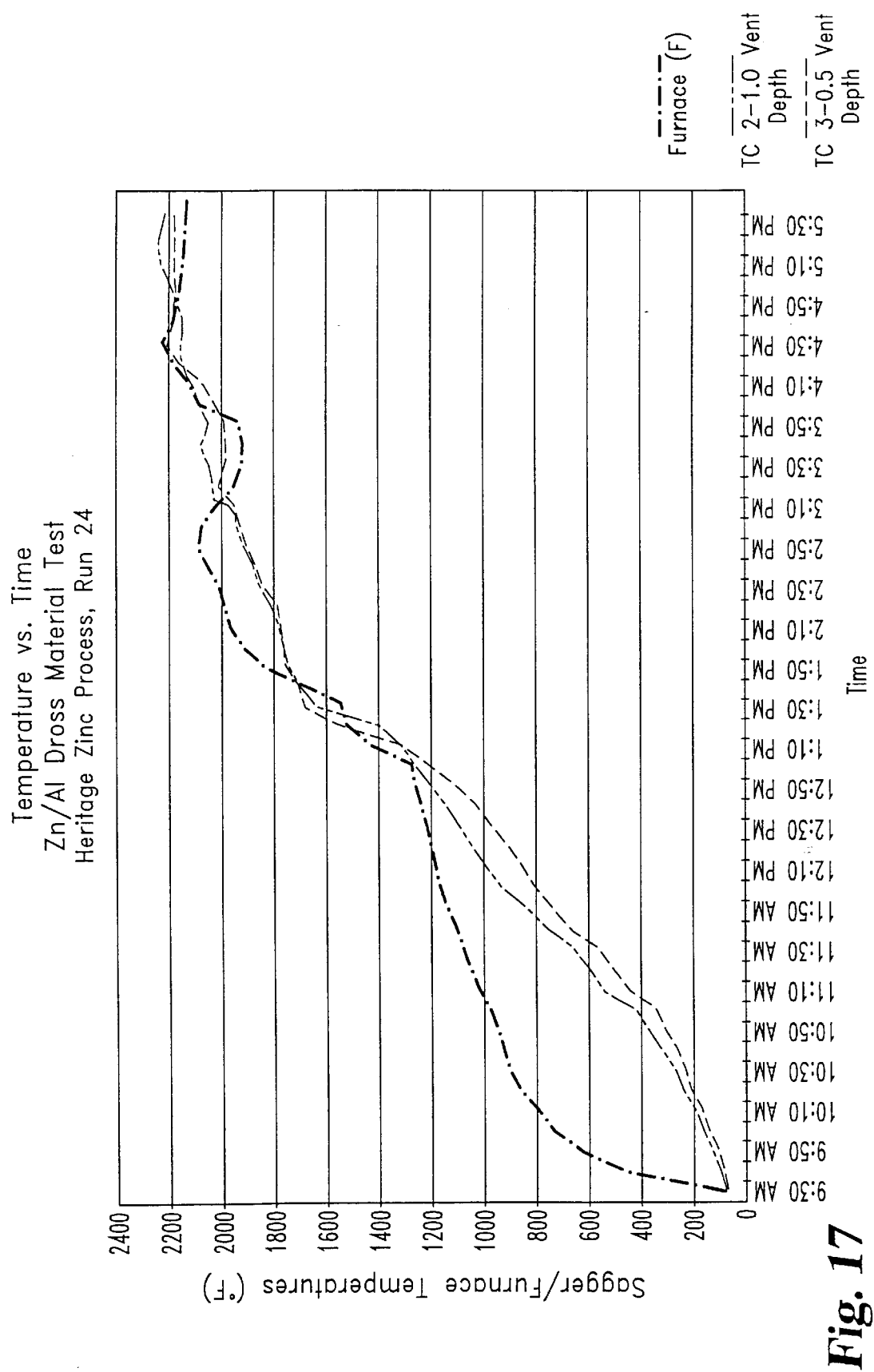
FIG. 17 shows the temperature profiles for Run 24.

The purpose of Run 24 was to evaluate the ability of the process to remove zinc from other zinc bearing materials. The zinc bearing material tested was a zinc-aluminum dross. The temperature profile is shown in FIG. 17 and the analysis results are shown in Table 29.

TABLE 29

ANALYSES OF START BRIQUETTES/IRP
Varied Coke Addition Test
Heritage Zinc Process, Run 24

| Sagger | Material | Reductant Binder | | Zinc (ppm) | Aluminum (ppm) | Carbon (ppm) | Start Carbon (ppm) | Start Mass (lbs.) | End Mass (lbs.) | % Mass Removed |
|---|---|---|---|---|---|---|---|---|---|---|
| Sagger #1 | Eastern Alloys Zn-Al Dross | 10 parts coke, 17 parts cola, 6 parts CaO | Bottom Fraction | 86 | 260000 | 130000 | 65000 | 21.5 | 7.0 | 67.4 |
| | | | Top Fraction | 89 | 290000 | 110000 | | | | |
| Sagger #4 | Eastern Alloys Zn-Al Dross | 15 parts coke, 17 parts cola, 6 parts CaO | Bottom Fraction | 76 | 220000 | 87000 | 92000 | 17.0 | 10.5 | 38.2 |
| | | | Top Fraction | 68 | 270000 | 190000 | | | | |

TABLE 29-continued

ANALYSES OF START BRIQUETTES/IRP
Varied Coke Addition Test
Heritage Zinc Process, Run 24

| Sagger | Material | Reductant Binder | | Zinc (ppm) | Aluminum (ppm) | Carbon (ppm) | Start Carbon (ppm) | Start Mass (lbs.) | End Mass (lbs.) | % Mass Removed |
|---|---|---|---|---|---|---|---|---|---|---|
| Sagger #5 | Eastern Alloys Zn-Al Dross | 20 parts coke, 17 parts cola, 6 parts CaO | Bottom Fraction | 100 | 250000 | 240000 | 118000 | 20.0 | 13.0 | 35.0 |
| | | | Top Fraction | 170 | 190000 | 180000 | | | | |
| Sagger #6 | Eastern Alloys Zn-Al Dross | 25 parts coke, 17 parts cola, 6 parts CaO | Bottom Fraction | 200 | 240000 | 180000 | 141000 | 19.0 | 12.5 | 34.2 |
| | | | Top Fraction | 94 | 250000 | 200000 | | | | |

The zinc removal for this test was very good with less than 0.1% zinc remaining in the bottom material. An additional observation was that the aluminum in the material tested served as an alternative reductant in the reaction, replacing carbon. This resulted in a much more rapid reaction in the process and left some unreacted carbon in the remaining material.

Run 25

Figure 18:
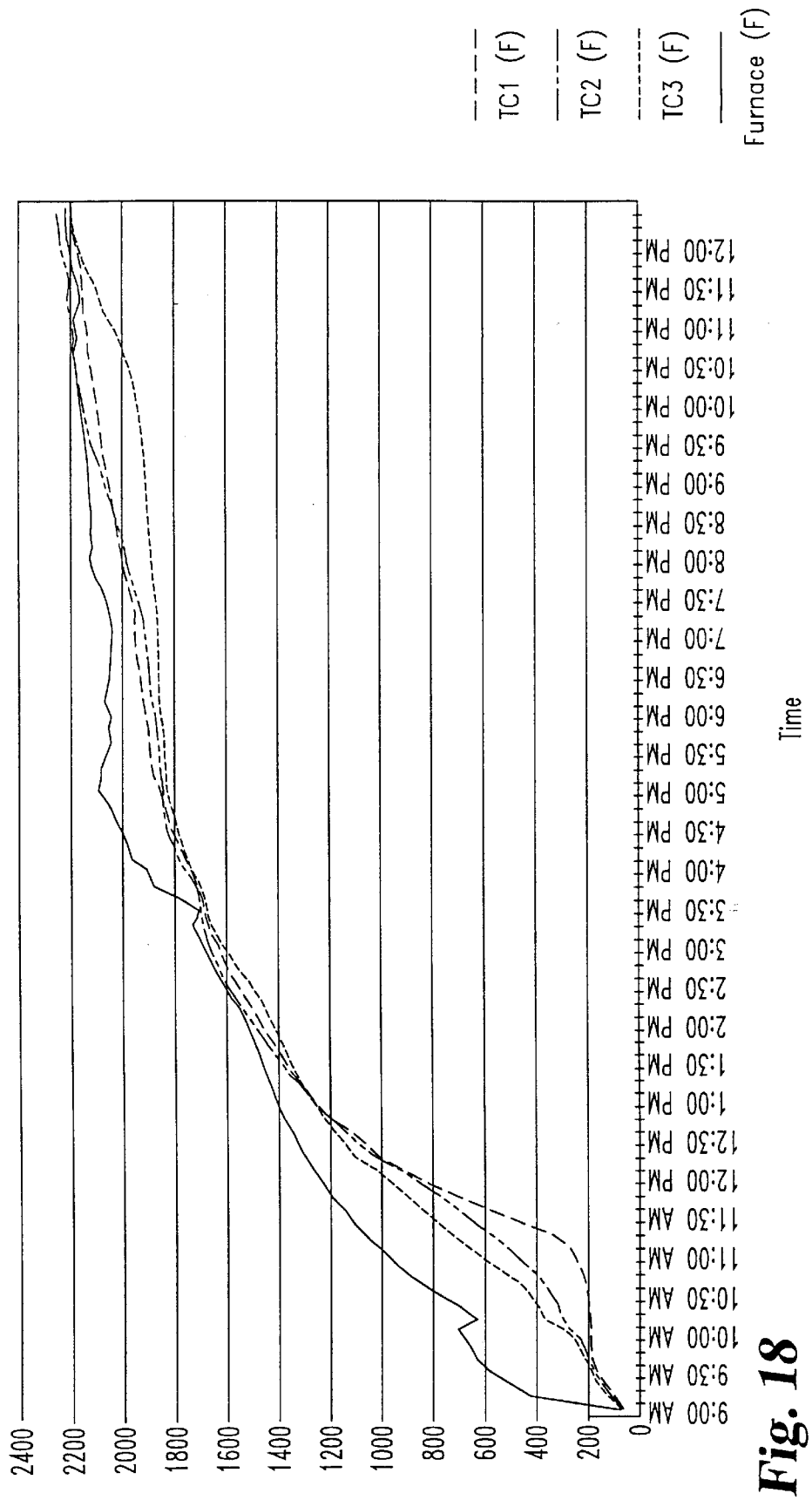
FIG. 18 shows the temperature profile for Run 25.

The primary purpose of Run 25 was to determine what happens in the process with higher lead concentrations. The tests were run with various levels of chloride in the mixtures. Analysis results are shown in Table 30 and the temperature profile is shown in FIG. 18. The sagger with no chloride (Sagger #4) had 1.5% of the lead removed, while saggers with chloride additions had 84 to 99% of the lead removed. It is apparent that chloride is required for the removal of lead from material being processed.

TABLE 30

ANALYSES OF START BRIQUETTES/IRP
Heritage Zinc Process, Run 25

| Sagger | Material | Reductant | | Zinc | Lead | Aluminum | Mass Zinc | % Mass Zinc | Mass Lead | % Mass Lead |
|---|---|---|---|---|---|---|---|---|---|---|
| Sagger #1 | 65 parts Nucor EAF dust, 35 parts brass mill dust. | 15 parts coke, 17 parts cola | Start | 340000 | 9200 | | 14.45 | 99.95 | 0.391 | 98.93 |
| | | | End | 640 | 320 | | 0.008 | | 0.0042 | |
| Sagger #2 | 65 parts Nucor EAF dust, 35 parts brass mill dust with 1 part calcium chloride added. | 15 parts coke, 15 parts cola | Start | 360000 | 9800 | | 16.20 | 99.56 | 0.441 | 83.67 |
| | | | End | 4700 | 4800 | | 0.071 | | 0.0720 | |
| Sagger #3 | 65 parts Nucor EAF dust, 35 parts brass mill dust with 2 parts calcium chloride added | 15 parts coke, 15 parts cola | Start | 340000 | 8700 | | 15.13 | 99.89 | 0.387 | 99.10 |
| | | | End | 1300 | 270 | | 0.017 | | 0.0035 | |
| Sagger #4 | 100 parts brass mill dust with 15 parts coke. | 15 parts coke, 17 parts cola | Start | 480000 | 22000 | | 17.28 | 99.43 | 0.792 | 1.52 |
| | | | End | 15000 | 120000 | | 0.098 | | 0.780 | |

Run 26

The primary purpose of Run 26 was to determine the minimum addition of carbon to EAF dust for high zinc removal. A second test performed to evaluate zinc reduction with aluminum (Sagger #6). The samples and results are shown in Table 31.

TABLE 31

ANALYSES OF START BRIQUETTES/IRP
Heritage Zinc Process, Run 26

| Sagger | Material | Reductant | | Zinc | Aluminum | Carbon | Mass Zinc | % Mass Zinc | Mass Carbon | % Mass Carbon |
|---|---|---|---|---|---|---|---|---|---|---|
| Sagger #1 | 100 parts EAF | 9 parts coke, 12 parts cola | Start | 280000 | | 87000 | 7.00 | 82.3 | 2.18 | 98.4 |
| | | | End | 92000 | | 2600 | 1.24 | | 0.04 | |
| Sagger #2 | 100 parts EAF | 11 parts coke, 12 parts cola | Start | 270000 | | 110000 | 6.35 | 97.5 | 2.59 | 99.9 |
| | | | End | 16000 | | 300 | 0.16 | | 0.00 | |
| Sagger #3 | 100 parts EAF | 13 parts coke, 12 parts cola | Start | 280000 | | 120000 | 7.70 | 99.4 | 3.30 | 97.9 |
| | | | End | 4200 | | 5900 | 0.05 | | 0.07 | |
| Sagger #4 | 100 parts EAF | 15 parts coke, 12 parts cola | Start | 280000 | | 130000 | 7.14 | 98.7 | 3.32 | 92.1 |
| | | | End | 8600 | | 25000 | 0.09 | | 0.26 | |
| Sagger #5 | 100 parts EAF | 20 parts coke, 12 parts cola | Start | 260000 | | 150000 | 6.11 | 99.4 | 3.53 | 85.5 |
| | | | End | 3600 | | 51000 | 0.04 | | 0.51 | |
| Sagger #6 | 100 parts Zinc Dross | 6 parts CaO, 15 parts cola | Start | 380000 | 230000 | | 9.69 | 99.9 | | |
| | | | End | 710 | 360000 | | 0.01 | | | |

It was determined that zinc removal from IRP began to drop as the quantity of coke is decreased to less than 11 parts of coke per 100 parts of EAF dust. The aluminum test (Sagger #6) indicated that zinc concentration was reduced from 38% to less than 0.1 % without any carbon additions.

Run 27

The assembly illustrated in FIGS. 7 and 8 is set up to produce high quality zinc material. The experiment uses countercurrent flow of solid and gas streams in the tunnel kiln to reflux compounds with lower volatilization points. The countercurrent flow is established by pushing the kiln cars with the loads of solids through the tunnel kiln, while using a fan to pull air in the opposite direction through the kiln. FIG. 7 illustrates the actions that take place in the segment of the kiln where metal halides are volatized from the solid material as the temperature in the kiln increase. These metal halide vapors will move with the air stream to the cooler areas of the kiln where they will either be removed at the center of the kiln or continue through the kiln to an area where they will condense. If the metal halides condense, they will deposit on the kiln cars where they will travel to hot zones of the kiln where they will volatize again. This refluxing action in the center segment of the tunnel kiln will prevent metal halides from travelling down the kiln where they would contaminate the zinc product exiting with the solids. In this experiment, materials exiting the kiln are collected and compared with other materials exiting the kiln. Samples of dropout material are also collected from the bottom of the kiln, to determine composition of the material at various points along the heating zones of the process.

At the beginning of the experiment, metal halides are observed being removed from the kiln. Cadmium is also detected in the earliest material exiting the kiln. As metal halide fumes are moving through the kiln, they begin to condense in the cooler zones of the kiln. At this point, a portion of the metal halides begin to condense and begin to drop out onto the kiln cars. Sampling conducted at this point indicated cadmium does not condense out in the kiln, but continues out of the kiln to be oxidized, and reports to the baghouse.

As the kiln car proceeds though the kiln, the temperature increases and zinc metal is beginning to volatilize from the saggers. Metal fumes escape and enter the kiln environment. At this point, zinc fumes are oxidized and a portion of it is observed to dropout onto the kiln cars, along with metal halides that have accumulated from the cooler zones. Metal halides present in this material begin to volatilize from this dropout material when a temperature zone has been reached that will allow volatilization of this material. Metal oxides in the dropout material remain on the car throughout the kiln.

It was determined through all heat zones, metal halides are being produced. In the later heating zones, the metal halides remain volatile until they exit the kiln, where the are condensed prior to reporting to the baghouse. Zinc chloride produced in the hotter zones aids in converting lead to lead chloride, and the zinc fume produced oxidizes and drops out onto the kiln car. The more volatile lead chloride continues out of the kiln and reports to the baghouse.

It is observed through the zones in the kiln that if a metal halide drops out onto the kiln car, then revolatilizes once the kiln car enters a hotter zone, the revolatilized metal halide partially condenses again as the vapors flow toward the cooler end of the kiln to exit at the offtake. Thus, a refluxing action is observed with this material. Once the kiln cars reach the hotter zones of the kiln, the refluxing of metal halides from the dropout material is still observed to be occurring. Once the dropout material exits the kiln, analysis has shown that metal halides have been effectively removed from the zinc oxide material remaining. Cadmium does not exist in the material, as it has exited as a fume at the beginning of the process. Lead has been removed by the conversion of zinc chloride to lead chloride, thus leaving the zinc to remain to be oxidized.

Run 28

Zinc ferrite begins to reduce at a low temperature (600 degrees C.); however, a significant amount still would remain in the process at 1000 degrees C. under normal operating conditions. In theory an increase in carbon content resulting in a higher CO to $CO_2$ ratio should allow zinc ferrite to be removed at lower operating temperatures. If this can be accomplished, the tunnel kiln system can be operated at lower temperatures, allowing less expensive materials of construction to be used for the kiln and saggers.

In this experiment, a reductant, such as coke, is added in increasingly higher ratios to determine the impact on zinc removal from EAF dust in the process. The process is operated at a lower temperature of about 1000° C. The test is performed with six saggers of coke/EAF dust mixtures representing ratios of 15 parts coke to 100 parts EAF dust, 20 parts to 100 parts, 25 parts to 100 parts, 30 parts to 100 parts, 35 parts to 100 parts and 40 parts to 100 parts.

The saggers are heated in the furnace to the final process temperature 1000° C. and held at that temperature for three hours. The load of material are then cooled and samples of material remaining in the saggers are analyzed for zinc, lead, cadmium and carbon. If the results are not acceptable at 1000 degrees C. (1832 degrees F.), this experimental run could be repeated at 1050 degrees C. (1922 degrees F.), 1100 degrees C. (2012 degrees F.) and 1150 degrees C. (2102 degrees F.).

If the zinc content of the remaining bottom product can be reduced to a low zinc level with a reasonable addition of reductant, it may be advisable to run the process at a lower temperature. The trade off for the process would be the lower cost of materials of construction for the tunnel kiln and sagger material versus the increased cost for reductant material and the loss of process capacity due to the volume of reductant material that is used.

SUMMARY OF CONCLUSIONS FROM THE RUNS

Removal of Toxic Metals from the Iron-Rich End Product

One of the primary goals of the present invention is to remove toxic metals, i.e., lead and cadmium, from the iron-rich end product remaining in the saggers after the processes of this invention are complete. Table 32 provides a summary of the completed pilot plant runs. The eight runs operated with a final temperature inside the saggers of more than 1210° C. (2210° F.) show that lead and cadmium concentrations in the IRP are below 0.02 wt %.

TABLE 32

REMOVAL OF TARGET METALS FOR COMPLETED RUNS

| Run Number | Max. Temp. in Saggers (° C.) | Max. Temp. in Saggers (° F.) | Concentration of Target Metal in IRP (wt %) | | |
|---|---|---|---|---|---|
| | | | Zinc | Lead | Cadmium |
| 3 | 1210 | 2210 | 0.015 | <0.010 | <0.0010 |
| 4 | 1162 | 2123 | 6.4 | <0.025 | <0.0025 |

TABLE 32-continued

REMOVAL OF TARGET METALS FOR COMPLETED RUNS

| Run Number | Max. Temp. in Saggers (° C.) | Max. Temp. in Saggers (° F.) | Concentration of Target Metal in IRP (wt %) | | |
|---|---|---|---|---|---|
| | | | Zinc | Lead | Cadmium |
| 7 | 972 | 1782 | N/A | N/A | N/A |
| 8 | 902 | 1656 | 24.61 | 0.163 | Not Detected |
| 9 | 1226 | 2239 | 1.0 | <0.20 | <0.011 |
| 10 | 1221 | 2230 | 0.28 | <0.20 | <0.011 |
| 11 | 1218 | 2225 | 3.3 | <0.20 | <0.011 |
| 14 | 1213 | 2226 | N/A | N/A | N/A |
| 15A | 900 | 1650 | 20 | <0.20 | <0.011 |
| 15B | 986 | 1807 | N/A | N/A | N/A |
| 16 | 1213 | 2226 | 0.10 | <0.12 | N/A |
| 19 | 1151 | 2102 | 9.9 | <0.11 | <0.0064 |
| 21 | 1233 | 2252 | 1.2 | <0.00098 | 0.00023 |
| 22 | 1228 | 2242 | 0.14 | <0.00098 | 0.00024 |

Notes:
Analyses completed by HRG ICP-AES, SW-846 6010B

Recovery of Zinc from EAF Dust

A second major goal for this invention is to maximize the recovery of zinc from EAF dust, to produce more zinc oxide and a low-zinc iron-rich product (IRP) available to market.

The residual zinc content in the IRP was less than 0.5 wt % in 5 of the 8 runs where the temperature inside the saggers was more than 1204° C. (2200° F.) (see Table 32). Two trials, Runs 9 and 11, had high residual zinc concentrations in the IRP as a result of experimentation with saggers with top vent space. The top vents allowed zinc oxide to redeposit on top of the IRP in these two runs. The cause for the high residual zinc level in Run 21 was not apparent.

Operating Time and Temperature

The trials demonstrated that the operation temperature in the saggers must be greater than 1218° C. (2225° F.) to recover 95 wt % of the zinc. A specific run (Run 19) was taken to 1149° C. (2100° F.) to test a lower operating limit, but zinc was not successfully removed, as 9 wt % zinc remained in the IRP.

The critical variables for the pilot trials were bed depth of material in the saggers and hot processing time. These two factors are important variables in determining processing capacity for the final design of the system. Bed depths were evaluated from 12.7 cm (5.0 in) to 35.5 cm (14.0 in), with most of the testing at either 12.7 cm (5.0 in) or 15.3 cm (6.0 in). Successful runs were completed with a bed depth as high as 22.9 cm (9.0 in) (see Table 33).

TABLE 33

OPERATING CONDITIONS FOR TEST RUNS OVER 1204° C. (2200° F.)

| Run Number | Max. Temp. in Saggers (° C.) | Max. Temp. in Saggers (° F.) | Run Time (hrs) | Sagger Depth (in) | wt % Zn in IRP | Sagger Configuration (total/layers) | Oxidizing/ Reducing |
|---|---|---|---|---|---|---|---|
| 3 | 1210 | 2210 | 13.50 | 5.00 | 0.02 | 8/2 | R |
| 9 | 1226 | 2239 | 14.25 | 9.00 | 0.13 to 1.0 | 1/1 | O |
| 10 | 1221 | 2230 | 11.25 | 5.00 | 0.28 | 8/2 | O |

TABLE 33-continued

OPERATING CONDITIONS FOR TEST RUNS OVER 1204° C. (2200° F.)

| Run Number | Max. Temp. in Saggers (° C.) | Max. Temp. in Saggers (° F.) | Run Time (hrs) | Sagger Depth (in) | wt % Zn in IRP | Sagger Configuration (total/layers) | Oxidizing/ Reducing |
|---|---|---|---|---|---|---|---|
| 11 | 1218 | 2225 | 13.00 | 12.00 | 3.33 | 1/1 | O |
| 14 | 1213 | 2226 | 6.00 | 5.00 | 0.25 | 8/2 | O |
| 16 | 1213 | 2226 | 14.00 | 9.00 | 0.1 | 4/1 | R |
| 21 | 1233 | 2252 | 17.50 | 6.00 | 1.2 | 6/2 | R |
| 22 | 1228 | 2242 | 12.25 | 6.00 | 0.14 | 6/2 | O |

Notes:
Analyses completed by HRG ICP-AES SW-846 6010B

The best run, from a processing time perspective, was a six-hour hot processing time using a bed depth of 12.7 cm (5.0 in) during Run 14. The process was also run for 12.25 hours with a 15.3 cm (6.0 in) bed depth for Run 22, and 14 hours with a 22.9 cm (9.0 in) bed depth for Run 16. These results indicate that the process may be able to use a rapid hot processing time (six to eight hours). However, the choice of saggers for the system will affect process design. The process heating cycle for the system will need to be sufficiently conservative enough to prevent damage to the saggers, yet allow the material in the saggers with a bed depth of 15.3 cm (6.0 in) to be completely processed.

Reducing or Oxidizing Operation

There were eight runs completed to the end temperature inside the saggers of 1210° C. (2210° F.), which has been determined to be required for the process to be complete (see Table 33). Three of the runs (Runs 3, 16 and 21) were performed in the reducing mode and five runs (Runs 9, 10, 11, 14 and 22) were performed in an oxidizing mode. The basic desired process results were attained for all of these runs. The final two runs (Runs 21 and 22) were performed specifically to demonstrate that the process could operate in either a reducing (Run 21) or an oxidizing mode (Run 22).

Maximizing Zinc Oxide Dropout

Runs 3 and 4 were operated under reducing conditions in the pilot unit. In this mode, the volatilized zinc metal exiting the saggers remained volatile until it reached the exit of the kiln, where it was oxidized on its way to the baghouse. Later runs (Runs 7 to 14) were operated under oxidizing conditions in the unit. Reducing conditions were repeated for Runs 16, 19 and 21. The final run (Run 22) was completed maintaining a highly controlled oxidizing atmosphere within the kiln.

When the oxidizing conditions were maintained, high purity zinc oxide material dropped out inside the furnace. Because the atmosphere inside the saggers is reducing, zinc oxide is reduced to zinc metal that volatilizes and exits the saggers. When the oxidizing atmosphere is reached, the volatilized zinc metal is oxidized to zinc oxide and is no longer volatile at the operating temperature. The zinc oxide then settles out in the kiln. This occurred during Runs 7, 8, 9, 10, 11, 13, 14 and 22. A mass balance for target metals, completed for Run 22, indicated that approximately 59% of the zinc leaving the EAF dust mixture was recovered as zinc oxide product that had dropped out in the furnace. The zinc that reported to the baghouse as zinc oxide was determined to be about 40% of the recovered zinc products. Samples of the zinc oxide product from the furnace dropout and baghouse dust were evaluated using testing procedures that are known in the art. Table 34 shows less than 0.06% impurities identified in the kiln dropout material. The baghouse dust from this run supports the results in that it had significant concentrations of lead, chloride and cadmium.

TABLE 34

ANALYSIS OF BAGHOUSE DUST AND FURNACE DROPOUT

| Target Constituent | Baghouse Dust (Run 6-10), wt % | Furnace Dropout (Run 10), wt % |
|---|---|---|
| Zn | 67.5 | 80.5 |
| Fe | 0.02 | 0.004 |
| Pb | 1.16 | 0.006 |
| Cd | 0.05 | 0.013 |
| Cu | 0.006 | 0.001 |
| Na | 0.73 | 0.002 |
| K | 1.03 | 0.0014 |
| Mg | 0.002 | 0.0002 |
| Cl$^-$ | 4.72 | 0.02 |
| F$^-$ | 0.11 | 0.0007 |
| Al | 0.002 | 0.002 |
| Ni | 0.002 | 0.003 |
| Co | <0.0001 | <0.0001 |
| As | 0.005 | <0.0001 |
| Sn | 0.009 | 0.005 |
| Sb | 0.0004 | 0.0002 |

Note:
Analyses run by AA (SW84-7950), ICP-MS (SW846-6020), silver nitrate predpitation (SW846-9253) and selective ion electrode (SW846-9214).

A second method to produce high quality zinc oxide material in the process was identified and evaluated. The baghouse dust was reprocessed in the kiln in Runs 17 and 19 to see if the lead, cadmium and chloride levels would be reduced. Zinc oxide purity was marginally improved (Run 17), but the baghouse dust was only taken up to a temperature of 982° C. (1800° F.). When the baghouse dust was taken to a temperature of 1149° C. (2100° F.) during Run 19, halogens such as chloride were successfully volatized from the zinc oxide product and the quality was improved significantly. Processing baghouse dust in this manner has its limitations, since the halogens do not leave the system but return to the baghouse. Removal of baghouse dust for processing outside the process loop would be necessary to "bleed off" excess halogens.

Evaluation of Saggers

Saggers are ceramic boxes that carry the briquettes through the tunnel kiln. Within each box, a reducing environment is created, even though the atmosphere outside the sagger in the kiln is an oxidizing environment. The first saggers used for the process were high alumina saggers with side vents. The alumina saggers worked very well for the initial runs, but their cost is relatively high. The shallow bed depth of the material in the high alumina saggers, which was 12.7 cm (5.0 in), posed material processing limitations. Therefore, other sagger options were sought. Less expensive cordierite saggers, with a slightly deeper bed depth of 15.3 cm (6.0 in), were tested. Larger high alumina saggers were later acquired and tested with various material bed depths, up to a maximum bed depth of 38 cm (15 in).

The deeper bed sagger test demonstrated that the vent area is a very important parameter in the design of the process. The larger high alumina saggers did not have sufficient vent area to allow all of volatilized metallurgical fumes to escape from the sagger. The vent area/material volume relationship was evaluated during Runs 7, 8, 9, 10 and 11. It was determined that about 0.25 ft.$^2$ of vent area is required for each cubic foot of material being processed. Vent location also impacted adequate zinc removal from the IRP. This relationship was evaluated along with the bed depth and heating time for the process. When insufficient vent space was provided, the zinc vapors did not exit the saggers fast enough and the vent holes plugged. This plugging is caused by the conversion of zinc metal into zinc oxide, which is not volatile and the backpressure from the small openings. The result is a process that either takes longer to run to completion or blockage that prevents the process from running to its end point.

Requirements for Covers on the Saggers

One trial was performed without covers on the saggers. This mode of operation was used to evaluate a suggested design using single saggers in the stacks. Run 20 used a large sagger that was filled less than half full of material. The result was that it did not provide a reducing atmosphere within the sagger and therefore the oxides did not reduce to the metallic form and the process did not work. Based on this test, it was concluded that the system will have to operate with saggers nearly full to ensure that the partial pressure of carbon monoxide is at least 50 times the partial pressure of carbon dioxide to ensure the reduction of metal oxides take place.

Briquette Making

Attempts were made during the initial trials to use a pelletizer to prepare the EAF dust mixture for the process. It was found that a briquette machine was able to produce a material that was more uniform and easier to handle. The decision was made to make a small briquette for use in the process to reduce the internal distance that metallurgical fumes needed to travel to exit the briquette. Additionally, use of briquettes provided a loosely packed bed that allowed interconnected voids to permit volatile compounds to escape and exit the saggers. The briquette size used in the pilot system can be used in the full-scale process to eliminate any potential problems associated with changing this variable. The approximate size of the briquette was 4.28 cm (1.68 in) in length, 2.15 cm (0.85 in) in width and 1.24 cm (0.49 in) in height.

The first 22 pilot runs used a mixture of EAF dust, coke and water, without any binder additives. While this was sufficient for the pilot system, the briquettes used were very fragile, especially shortly after they were made. As a result, several laboratory tests were run to make briquettes with different mixtures of EAF dust, coke, water, lime and binder materials. The main focus of these tests was to improve the "green strength" (strength immediately after the briquettes are made), so the briquettes can be moved from the place where they are made to the location where they will be processed without damaging the briquette. The final 4 pilot runs used binder materials to improve the "green strength" of the briquettes.

CONCLUSIONS

Successful tests were completed by maintaining a reduction zone, by use of covered saggers, and conducting the reduction while the covered saggers were within an oxidizing zone. Zinc was successfully extracted from the EAF dust blend to levels less than 1 wt % Zn remaining in the IRP. A high concentration zinc oxide with few impurities was produced in the kiln, and a crude zinc oxide concentrate was produced from the baghouse.

During the pilot tests, upon optimization of the process, operating parameters were determined. During a controlled oxidizing run (Run 22), it appeared that between a 2% to 4% oxygen level was sufficient to allow approximately 60% of the extracted zinc to be recovered in the kiln as high concentration zinc oxide, with approximately 40% of the extracted zinc reporting to the baghouse as halides and oxides. Depending on further evaluation of heat balance for the system, reaction rates for the formation of the oxide and evaluation of residence time in a tunnel kiln due to velocity rates, this oxygen level may change.

It was found that the with run times of 6 to 14 hours and temperatures of above 1218° C. (2225° C.), zinc was extracted from the IRP. The reaction kinetics, i.e. mass transfer kinetics, may ultimately decide how the run will progress through the final heating cycle time.

Products with a higher value may be determined upon use of an additional processing step. For example, specific size fractions of the zinc oxide product may have a higher value to certain processors. Certain size fractions of dropout material or baghouse dust may contain a higher concentration of zinc. Conversely, a certain size fraction may contain a higher level of impurities, providing an opportunity to further purify the end product by beneficiation.

The same logic can be applied to the IRP material. Little effort has been expended to date on finding the most economical use for the IRP, because it does not represent and important factor in the overall economics. However, as the process continues into full-scale, the optimization of the value of the IRP could provide valuable incremental economic advantages.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A process for separating and recovering a desired metal as metal oxide from raw material containing metal oxides, comprising the steps of:

placing the raw material and a reductant in a container to form a reducing microclimate within the container;

heating a housing to maintain a temperature zone within the housing at a heating temperature sufficient to expose the raw material in the container to a reaction temperature that is higher than the boiling point of the desired metal, the temperature zone having an oxidizing atmosphere;

conveying the container containing the raw material through the temperature zone in the housing to expose the raw material and the reductant to the reaction temperature wherein the metal oxide is reduced to a gaseous metal that exits the container;

exposing the gaseous metal to the oxidizing atmosphere of the temperature zone wherein the desired metal is oxidized to metal oxide; and collecting the metal oxide.

2. The process of claim 1 further comprising:

maintaining a second temperature zone in the housing at a metal halide vaporization temperature, the metal halide temperature being lower than the heating temperature;

applying a flow of air through the housing in a direction that is opposite to a direction of travel of the container during the conveying step, whereby a metal halide in the raw material is volatilized to a volatilized metal halide when the container is conveyed through the second heating zone; and collecting the volatilized metal halide.

3. The process of claim 2 wherein the metal halide vaporization temperature is between about 1600° F. and about 2000° F.

4. The process of claim 3 wherein the metal halide vaporization temperature is about 1800° F.

5. The process of claim 2, further comprising mixing a halide with the raw material and the reductant, whereby the halide reacts with metal compounds in the raw material to form metal halides, the metal halides having a boiling point that is at least as low as the metal halide vaporization temperature.

6. The process of claim 2 wherein the halide is a chloride.

7. The process of claim 1 wherein the reductant contains carbon.

8. The process of claim 7 wherein the reductant is coke or coal.

9. The process of claim 1 wherein the reductant contains a metal.

10. The process of claim 9 wherein the reductant includes aluminum.

11. The process of claim 1 wherein the heating step includes maintaining the temperature zone at an oxygen level of at least about 2.0 %.

12. The process of claim 1, further comprising the step of:
mixing the raw material with the reductant before the placing step.

13. The process of claim 1 wherein the heating step includes maintaining the partial pressure of carbon monoxide to carbon dioxide within the container at a ratio that is sufficient to achieve a reducing microclimate within the container.

14. The process of claim 1, further comprising the step of:
blending the raw material and the reductant with a binding agent to form a blend before the placing step; and
forming the blend into formed units.

15. The process of claim 14 wherein the binding agent includes water.

16. The process of claim 14 wherein the placing step includes loading the formed units in the bed to a depth of between about 1.0 inches (2.5 cm) to about 14.0 inches (35.5 cm).

17. The process of claim 1 wherein the conveying step includes conveying the container on a kiln car and the collecting step includes collecting the metal oxide from the kiln car as the kiln car exits the housing.

18. A process for separating and recovering zinc oxide and iron-rich product from electric arc furnace dust containing zinc oxide and iron-rich materials, comprising:

placing the electric arc furnace dust and a reductant in a container to form a reducing microclimate;

heating a housing to maintain a temperature zone at a heating temperature sufficient to expose the raw material in the container to a reaction temperature that is higher than the boiling point of zinc metal, the temperature zone having an oxidizing atmosphere;

conveying the container containing the electric arc furnace dust and the reductant through the temperature zone in the housing to expose the electric arc furnace dust and the reductant to the reduction temperature wherein zinc oxide in the electric arc furnace duct is reduced to zinc metal gas that exits the container;

exposing the zinc metal gas to the oxidizing atmosphere of the temperature zone wherein the vaporized zinc metal is oxidized to zinc oxide in the housing; and collecting the zinc oxide from the housing and collecting the iron-rich product from the container.

19. The process of claim 18 further comprising:

maintaining a second temperature zone in the housing at a metal halide vaporization temperature, the metal halide temperature being lower than the heating temperature;

applying a flow of air through the housing in a direction that is opposite to a direction of travel of the container during the conveying step, whereby a metal halide in the raw material is volatilized to a volatilized metal halide when the container is conveyed through the second heating zone; and collecting the volatilized metal halide.

20. The process of claim 19 wherein the metal halide vaporization temperature is between about 1600° F. and about 2000° F.

21. The process of claim 20 wherein the metal halide vaporization temperature is about 1800° F.

22. The process of claim 19 wherein the halide is a chloride.

23. The process of claim 18 wherein the reductant contains carbon.

24. The process of claim 23 wherein the reductant is coke or coal.

25. The process of claim 19, further comprising mixing a halide with the raw material and the reductant, whereby the halide reacts with metal compounds in the raw material to form metal halides, the metal halides having a boiling point that is at least as low as the metal halide vaporization temperature.

26. The process of claim 18 wherein the reaction temperature is at least about 900° C. (1652° F.).

27. The process of claim 26 wherein the reaction temperature is between about 1218° C. (2225° F.) and about 1649° C. (3000° F.).

28. The process of claim 18 wherein the heating step includes maintaining the partial pressure of carbon monoxide to carbon dioxide within the container at a ratio that is sufficient to achieve a reducing microclimate within the container.

29. The process of claim 18 wherein the heating step includes maintaining the temperature zone at an oxygen level of at least about 2.0 %.

30. The process of claim 18 wherein the conveying step includes conveying the container through the temperature zone in about one to about twenty hours.

31. The process of claim 30 wherein the conveying step includes conveying the container through the temperature zone in about ten to about fourteen hours.

32. The process of claim 18, further comprising the step of:
- mixing the raw material with the reductant before the placing step.

33. The process of claim 32, further comprising the step of:
- blending the raw material and the reductant with a binding agent to form a blend before the placing step; and
- forming the blend into formed units.

34. The process of claim 33 wherein the placing step includes loading the container with blend so that the container has a vent area/material volume ratio of at about 0.25 feet2 of vent area per cubic foot of blend within the bed.

35. The process of claim 34 wherein the raw material is present in the blend in an amount between about 65 wt % and about 80 wt %, the reductant is present in an amount between about 10 wt % and about 20 wt % and the binding agent is present in an amount between about 10 wt % and about 20 wt %.

36. The process of claim 35 wherein the binding agent includes water present in the amount of about 3.0 wt % to about 20.0 wt %.

37. The process of claim 18 wherein the reductant is present in an amount sufficient to completely reduce the zinc oxide present in the electric arc furnace dust.

38. The process of claim 33 wherein the raw material is present in the blend in an amount of about 85 wt %, the reductant is present in an amount of about 15 wt %.

39. The process of claim 33 wherein the raw material is present in the blend in an amount of about 84.5 wt %, the reductant is present in an amount of about 12.0 wt % and the binding agent is present in an amount of about 3.0 wt %.

40. The process of claim 33 wherein the placing step includes loading the formed units in the bed to a depth of between about 1.0 inches (2.5 cm) to about 14.0 inches (35.5 cm).

41. The process of claim 40 wherein the placing step includes loading the formed units in the bed to a depth of between about 5.0 inches (12.7 cm) to about 9.0 inches (22.9 cm).

42. The process of claim 41 wherein the placing step includes loading the briquettes or pellets in the bed to a depth of about 6.0 inches (15.2 cm).

43. The process of claim 18 wherein the conveying step includes conveying the container on a kiln car and the collecting step includes collecting the metal oxide from the kiln car as the kiln car exits the tunnel.

44. A process for treating electric arc furnace dust, comprising:
- placing the electric arc furnace dust and a reductant containing carbon in a container to form a reducing microclimate having a partial pressure of carbon monoxide to carbon dioxide sufficient to reduce metal oxides in the electric arc furnace dust to a corresponding metal;
- heating a housing to maintain a temperature zone at a heating temperature sufficient to expose the raw material in the container to a reaction temperature that is higher than the boiling point of zinc metal, the temperature zone having an oxidizing atmosphere;
- conveying the container containing the electric arc furnace dust and the reductant through the housing to expose the electric arc furnace dust and the reductant to the reaction temperature wherein zinc oxide in the raw material is reduced to zinc metal gas that exits the container;
- exposing the zinc metal gas to the oxidizing atmosphere of the temperature zone wherein the vaporized zinc metal is oxidized to zinc oxide in the housing;
- collecting the zinc oxide from the housing, the zinc oxide collected from the housing having less than about 0.06% impurities and collecting the iron-rich product from the container, the iron-rich product having between less than about 1.0% zinc and less than detectable levels of lead and cadmium; and
- collecting volatilized halogens of lead and cadmium in a baghouse.

45. The process of claim 44 wherein the iron-rich product has between about 0.02% to about 1.0% zinc.

* * * * *